(12) United States Patent
Fowler et al.

(10) Patent No.: US 11,481,807 B2
(45) Date of Patent: Oct. 25, 2022

(54) DELIVERY OF DYNAMIC CONTENT BASED UPON PREDETERMINED THRESHOLDS

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 17/660,672

(22) Filed: Apr. 26, 2022

(65) Prior Publication Data

US 2022/0253902 A1 Aug. 11, 2022

Related U.S. Application Data

(63) Continuation-in-part of application No. 17/446,298, filed on Aug. 29, 2021, which is a continuation-in-part of application No. 17/302,233, filed on Apr. 27, 2021, now Pat. No. 11,106,753.
(Continued)

(51) Int. Cl.
*G06Q 30/02* (2012.01)
*G06F 16/955* (2019.01)

(52) U.S. Cl.
CPC ..... *G06Q 30/0261* (2013.01); *G06F 16/9554* (2019.01); *G06Q 30/0252* (2013.01); *G06Q 30/0258* (2013.01)

(58) Field of Classification Search
CPC .......... G06Q 30/0261; G06Q 30/0252; G06Q 30/0258; G06F 16/9554
(Continued)

(56) References Cited

U.S. PATENT DOCUMENTS 6,144,304 A 11/2000 Webb
6,658,348 B2 12/2003 Rudd et al.
(Continued)

FOREIGN PATENT DOCUMENTS

EP 2254083 A1 11/2010
EP 2988260 A1 2/2016
(Continued)

OTHER PUBLICATIONS

Gautam Garg, QR Codes in Sporting Goods Companies: Eight Use Cases Across the Industry, 2015 (Year: 2015).*
(Continued)

*Primary Examiner* — Tarek Elchanti
(74) *Attorney, Agent, or Firm* — Vos-IP, LLC

(57) ABSTRACT

A method for creating a unique digital experience based upon meeting a predefined threshold of users within a system comprising: detecting a machine-readable code with a user device and determining an identification of a user, the user device, or both; determining whether the identification of the user device contains a unique ID by querying a server; wherein if no unique ID is identified, issuing the unique ID to the user device; storing the unique ID within a database; determining a threshold of users for the system, wherein unique digital coupons are held until the meeting of said threshold; meeting said threshold and generating a unique digital coupon, said digital coupon being unique to the unique ID; and delivering the unique digital coupon to said user device.

8 Claims, 11 Drawing Sheets

Related U.S. Application Data

(60) Provisional application No. 63/269,015, filed on Mar. 8, 2022, provisional application No. 63/201,374, filed on Apr. 27, 2021, provisional application No. 63/201,373, filed on Apr. 27, 2021, provisional application No. 63/201,376, filed on Apr. 27, 2021, provisional application No. 63/015,688, filed on Apr. 27, 2020.

(58) Field of Classification Search
USPC .......................................................... 707/758
See application file for complete search history.

(56) References Cited

U.S. PATENT DOCUMENTS

| | | |
|---|---|---|
| 7,379,886 B1 | 5/2008 | Zaring et al. |
| 7,587,214 B2 | 9/2009 | Inselberg |
| 7,817,990 B2 | 10/2010 | Pamminger et al. |
| 8,056,802 B2 | 11/2011 | Gressel et al. |
| 8,494,838 B2 | 7/2013 | Donabedian et al. |
| 8,731,583 B2 | 5/2014 | Wengrovitz |
| 8,971,861 B2 | 3/2015 | Gupta et al. |
| 9,002,727 B2 | 4/2015 | Horowitz et al. |
| 9,117,231 B2 | 8/2015 | Rodgers et al. |
| 9,201,470 B2 | 12/2015 | Kim et al. |
| 9,223,750 B2 | 12/2015 | Liu et al. |
| 9,223,885 B2 | 12/2015 | Marsico |
| 9,324,079 B2 | 4/2016 | Moulin et al. |
| 9,405,844 B2 | 8/2016 | Lim et al. |
| 9,451,389 B2 | 9/2016 | Beg et al. |
| 9,681,302 B2 | 6/2017 | Robinton et al. |
| 9,767,645 B1 | 9/2017 | Cronin et al. |
| 9,826,049 B2 | 11/2017 | Lim et al. |
| 9,870,585 B2 | 1/2018 | Cronin et al. |
| 9,883,344 B2 | 1/2018 | Bolton et al. |
| 9,965,819 B1 | 5/2018 | Devries |
| 10,009,429 B2 | 6/2018 | Garcia Manchado |
| 10,163,124 B2 | 12/2018 | Horowitz et al. |
| 10,178,166 B2 | 1/2019 | Sharan |
| 10,248,905 B1 | 4/2019 | Beatty |
| 10,942,913 B1 | 3/2021 | Khoyilar et al. |
| 2001/0050310 A1 | 12/2001 | Rathus et al. |
| 2002/0016816 A1 | 2/2002 | Rhoads |
| 2003/0008661 A1 | 1/2003 | Joyce et al. |
| 2003/0041155 A1 | 2/2003 | Nelson et al. |
| 2006/0094409 A1 | 5/2006 | Inselberg |
| 2007/0229217 A1 | 10/2007 | Chen et al. |
| 2009/0085724 A1 | 4/2009 | Naressi et al. |
| 2009/0138920 A1 | 5/2009 | Anandpura et al. |
| 2009/0189982 A1 | 7/2009 | Tawiah |
| 2010/0184462 A1 | 7/2010 | Lapstun et al. |
| 2010/0228577 A1 | 9/2010 | Cunningham et al. |
| 2010/0279710 A1 | 11/2010 | Dicke et al. |
| 2011/0034252 A1 | 2/2011 | Morrison et al. |
| 2012/0011015 A1 | 1/2012 | Singh et al. |
| 2012/0130770 A1 | 5/2012 | Heffernan |
| 2012/0233237 A1 | 9/2012 | Roa et al. |
| 2012/0280784 A1 | 11/2012 | Gaviria Velez et al. |
| 2013/0073366 A1 | 3/2013 | Heath |
| 2013/0080218 A1 | 3/2013 | Wildern, IV et al. |
| 2013/0085834 A1 | 4/2013 | Witherspoon, Jr. et al. |
| 2013/0166384 A1 | 6/2013 | Das |
| 2013/0218721 A1 | 8/2013 | Borhan et al. |
| 2013/0275221 A1 | 10/2013 | Zeto, III et al. |
| 2013/0297430 A1 | 11/2013 | Soergel |
| 2013/0311214 A1 | 11/2013 | Marti et al. |
| 2014/0039945 A1 | 2/2014 | Coady et al. |
| 2014/0046802 A1 | 2/2014 | Hosein et al. |
| 2014/0058886 A1 | 2/2014 | Gopalakrishnan et al. |
| 2014/0156752 A1 | 6/2014 | Fetyko |
| 2014/0279072 A1 | 9/2014 | Serino |
| 2014/0282684 A1 | 9/2014 | Keen et al. |
| 2014/0365574 A1 | 12/2014 | Franks et al. |
| 2015/0067811 A1 | 3/2015 | Agnew et al. |
| 2015/0073879 A1 | 3/2015 | Acosta-Cazaubon |
| 2015/0081532 A1 | 3/2015 | Lewis et al. |
| 2015/0088658 A1 | 3/2015 | Iiduka et al. |
| 2015/0112704 A1 | 4/2015 | Braun |
| 2015/0120388 A1 | 4/2015 | Tan et al. |
| 2015/0161684 A1 | 6/2015 | Raikula |
| 2015/0279164 A1 | 10/2015 | Miller et al. |
| 2015/0294392 A1 | 10/2015 | Sharon et al. |
| 2015/0296347 A1 | 10/2015 | Roth et al. |
| 2015/0304601 A1 | 10/2015 | Hicks et al. |
| 2015/0348329 A1 | 12/2015 | Carre et al. |
| 2016/0086228 A1 | 3/2016 | Babb et al. |
| 2016/0104041 A1 | 4/2016 | Bowers et al. |
| 2016/0104347 A1 | 4/2016 | Yang |
| 2016/0189287 A1 | 6/2016 | Van Meter |
| 2016/0191821 A1 | 6/2016 | Dwarakanath et al. |
| 2016/0217258 A1 | 7/2016 | Pitroda et al. |
| 2016/0282619 A1 | 9/2016 | Oto et al. |
| 2016/0307379 A1 | 10/2016 | Moore, Jr. et al. |
| 2016/0335565 A1 | 11/2016 | Charriere et al. |
| 2016/0381023 A1 | 12/2016 | Dulce et al. |
| 2017/0039599 A1 | 2/2017 | Tunnell et al. |
| 2017/0142460 A1 | 5/2017 | Yang et al. |
| 2017/0330263 A1 | 11/2017 | Shaffer |
| 2017/0337531 A1 | 11/2017 | Kohli |
| 2018/0089775 A1 | 3/2018 | Frey et al. |
| 2018/0288394 A1 | 10/2018 | Aizawa |
| 2018/0330327 A1 | 11/2018 | Hertenstein et al. |
| 2018/0336286 A1 | 11/2018 | Shah |
| 2018/0353999 A1 | 12/2018 | McGillicuddy et al. |
| 2018/0376217 A1 | 12/2018 | Kahng et al. |
| 2019/0098504 A1 | 3/2019 | Van Betsbrugge et al. |
| 2019/0130450 A1 | 5/2019 | Lamont |
| 2019/0220715 A1 | 7/2019 | Park et al. |
| 2019/0385128 A1 | 12/2019 | Cummings |
| 2020/0035019 A1 | 1/2020 | Cappello et al. |
| 2020/0104601 A1 | 4/2020 | Karoui et al. |
| 2020/0184547 A1 | 6/2020 | Andon et al. |
| 2020/0213006 A1 | 7/2020 | Graham et al. |
| 2020/0236278 A1 | 7/2020 | Yeung et al. |
| 2020/0320911 A1 | 10/2020 | Bruce |
| 2020/0327997 A1 | 10/2020 | Behrens et al. |
| 2020/0413152 A1 | 12/2020 | Todorovic et al. |
| 2021/0019564 A1 | 1/2021 | Zhou et al. |
| 2021/0027402 A1 | 1/2021 | Davis et al. |
| 2021/0065256 A1 | 3/2021 | Shontz |
| 2021/0118085 A1 | 4/2021 | Bushnell et al. |
| 2021/0247947 A1 | 8/2021 | Jaynes et al. |
| 2021/0248338 A1 | 8/2021 | Spivack et al. |
| 2022/0114228 A1 | 4/2022 | Fowler et al. |
| 2022/0167021 A1 | 5/2022 | French et al. |
| 2022/0172128 A1 | 6/2022 | Lore |

FOREIGN PATENT DOCUMENTS

| | | | |
|---|---|---|---|
| EP | 3550844 A1 | 10/2019 | |
| FR | 3092195 A1 | 7/2020 | |
| KR | 10-2015-0042885 A | 4/2015 | |
| WO | WO/2006/011557 A1 | 2/2006 | |
| WO | WO/2008/124168 A1 | 10/2008 | |
| WO | WO/2013/120064 A1 | 8/2013 | |
| WO | WO-2013120064 A1 * | 8/2013 | ......... G06K 9/00671 |
| WO | WO/2014/081584 A1 | 5/2014 | |
| WO | WO-2014081584 A1 * | 5/2014 | ............. G06Q 30/06 |
| WO | WO/2014/112686 A1 | 7/2014 | |
| WO | WO/2015/035055 A1 | 3/2015 | |
| WO | WO/2016/041018 A1 | 3/2016 | |
| WO | WO/2019/016602 A2 | 1/2019 | |

OTHER PUBLICATIONS

International Search Report issued in International Application No. PCT/US2022/071913 dated Jun. 15, 2022.
International Search Report issued in International Application No. PCT/US2021/071461 dated Feb. 10, 2022.
International Search Report issued in International Application No. PCT/US2021/070471 dated Jun. 28, 2021.
International Search Report issued in International Application No. PCT/US2022/071912 dated Jul. 6, 2022.

(56) References Cited

OTHER PUBLICATIONS

International Search Report issued in International Application No. PCT/US2022/071938 dated Jul. 6, 2022.
International Search Report issued in International Application No. PCT/US2022/071906 dated Jul. 7, 2022.
International Search Report issued in International Application No. PCT/US2022/071910 dated Jul. 7, 2022.
International Search Report issued in International Application No. PCT/US2022/071915 dated Jul. 8, 2022.
"Blockchain", Wikipedia, Sep. 27, 2019.
"URL Redirection", Wikipedia, Mar. 21, 2021.
"Web Template System", Wikipedia, Mar. 2, 2021.
International Search Report issued in International Application No. PCT/US2022/071909 dated Aug. 3, 2022.
International Search Report issued in International Application No. PCT/US2022/071908 dated Aug. 8, 2022.

\* cited by examiner

DELIVERY OF DYNAMIC CONTENT BASED UPON PREDETERMINED THRESHOLDS

CROSS-REFERENCE TO RELATED APPLICATIONS

This application claims the benefit of U.S. Provisional Patent Application No. 63/201,376 filed on Apr. 27, 2021, U.S. Provisional Patent Application No. 63/201,373 filed on Apr. 27, 2021, U.S. Provisional Patent Application No. 63/201,374 filed on Apr. 27, 2021, U.S. Provisional Patent Application No. 63/269,015 filed on Mar. 8, 2022, and U.S. patent application Ser. No. 17/446,298 filed on Aug. 29, 2021, which is a continuation-in-part of U.S. patent application Ser. No. 17/302,233 filed on Apr. 27, 2021, which claims the benefit of U.S. Provisional Patent Application No. 63/015,688 filed on Apr. 27, 2020, all with the United States Patent and Trademark Office, the contents of which are incorporated herein by reference in their entirety.

FIELD OF THE INVENTION

The invention is related to distribution of digital content by accessing through a machine-readable code, and wherein content is specifically distributed upon meeting of a predetermined threshold.

BACKGROUND OF THE INVENTION

Motion picture trailers and advertising campaigns take considerable resources to produce and launch. Brand owners and stakeholders want to ensure that their campaign is viewed by the greatest number of people giving them a return on their investment. Additionally, current technology and social media has made it easy for the average user to capture that content and leak it to the general public before the stakeholder is ready for the content to be released or an average user can unofficially disseminate the content on channels not approved by the stakeholder.

Advertising space at highly attended and viewed events such as the Super Bowl and Olympics demand a premium price because there is a guaranteed audience. However, audiences are consuming vast sums of content from their smart phones and tablets. Therefore, as consumers continue to consume content in digital format, and increasingly from their handled devices, it becomes increasingly difficult for advertising campaigns to be impactful as stakeholders struggle to reach their intended audience.

Applicant has generated a new system and methodologies of generating content to an audience, based on the occurrence of certain triggers within the system, which provides for a gamification of the release of certain content, based on an individual user's actions or the actions of the system community as a whole. Such systems and methods provide for new and unique mechanisms to generate and release content to the users within the system.

SUMMARY OF THE INVENTION

The present invention is a system for delivering content to users only when a predetermined threshold has been met by users on the system. Upon the occurrence of that predetermined threshold, the system knows that there are enough users on the system so that the content will have maximum impact. The embodiments detailed herein specifically detail systems and methods for generating content by accessing a machine-readable code ("MRC"). In particular, preferred embodiments generate unique content, and wherein the system utilizes a unique ID to identify a user device within the system. These advantages allow for novel and unique opportunities that are not possible in the prior art. The system includes a plurality of tags, each with a MRC, each of the MRCs encoding a unique address and/or identification number that will direct the user device to a server system.

In one embodiment, the present invention provides a system for displaying customized content to users at a venue via a user device. The system comprising a server system having a computer processor and a computer memory; a plurality of tags, each with a MRC, each of the machine-readable codes encoding an address controlled by the server system, each of the tags being operatively mounted within the venue for access by the users in the venue. The server system performs the following steps: storing content in a database; collecting user data associated with the user; receiving a request from one of the user devices, the request being generated by scanning one of the tags with the user device; determining the user data associated with the user who scanned the tag; selecting, based upon meeting a threshold number of users, customized content from the content in the database; and delivering the customized content to the user device.

In a further preferred embodiment, a system for generating a unique content to a user device comprising: a server system having a computer processor and memory; a plurality of tags, each with a MRC, each of the MRCs encoding an address controlled by the server system, each of the tags being operatively mounted within the venue for access by the user devices in the venue; and wherein the computer memory of the server system stores executable code, wherein when executed, enables the server to perform a process comprising the following steps: receiving a request from one user device, the request generated by scanning one of the tags with said user device; directing the user device to a tag URL that is uniquely encoded to the tag; receiving at a redirect/identification server, the URL request, and determining whether the user device is new or returning, and informing an interface server of the result; the redirect/identification server counting the number of new or returning user devices to the system; when the total number of unique user devices reaches a predetermined threshold, receiving an instruction at an interface server which executes the process described in FIG. 5 regarding content to be generated; providing a second URL to the redirect/identification server; sending the second URL to the user device; displaying, from said second URL, unique content on said user device; obtaining a data from said user device; and upon the occurrence of a trigger, receiving a new URL from said interface server.

The embodiments detailed herein specifically detail systems and methods for generating content by accessing a machine-readable code ("MRC"). In particular, preferred embodiments generate unique content, and wherein the system utilizes a unique ID to identify a user device within the system. These advantages allow for novel and unique opportunities that are not possible in the prior art. With regard to entertainment venues, the present invention provides a system for the display of interactive content on a user device based on a number of determining factors including seat location, venue location, past user interactions, as well as data provided from other sources such as ticketing platform software and advertising database portals.

The system includes a plurality of tags, each with a MRC, each of the MRCs encoding a unique tag ID and/or tag URL that will direct the user device to a server system. The system may work independently of other multimedia displays located inside of the venue while providing content that is prescheduled or managed off site by the system. In certain embodiments, the system may also orchestrate the displayed user content based on the display of the multimedia production on the venue multimedia display system, when it receives a request from one of the user devices, generated by scanning one of the unique MRCs and/or NFC enabled tags with the user device, and provides the interactive content that corresponds, in real time, with the multimedia production currently being played on the venue multimedia display system.

In one embodiment, the present invention provides a system for displaying customized content to users at a venue via a user device. The system comprising a server system having a computer processor and a computer memory; a plurality of tags, each with a MRC, each of the machine-readable codes encoding an address controlled by the server system, each of the tags being operatively mounted within the venue for access by the users in the venue. The server system performs the following steps: storing content in a database; collecting user data associated with the user; receiving a request from one of the user devices, the request being generated by scanning one of the tags with the user device; determining the user data associated with the user who scanned the tag; selecting, based upon the user data, customized content from the content in the database; and, upon the meeting of a threshold, delivering the customized content to the user device.

A further objective is to provide a system that enables a variety of interactions with the venue and the users attending an event at the venue, for increased entertainment, more effective sales at the venue, and more effective marketing. The objective of these interactions is to provide users individualized content that is based on multiple data points in order for content to be relevant to users on a personal level. Each scan of the uniquely encoded NFC enabled and/or MRC will allow the system to provide personalized content to the user, while generating user data that can be attributed to a specific user who scanned that tag, or all past users who have scanned a tag specific to a venue or seat and utilized to provide more relevant content during current and future use sessions. Furthermore, the personalized content is enabled by creation of a unique user ID that corresponds specifically to a user device, wherein content can thus be specifically tailored and modified independently to each unique user ID, and not simply to all users within the system. This allows for the use of user captured data to modify and update personalized content in a strategic manner.

Another objective is to provide a system that provides greater level of customization to the content being disseminated. The customization allows for capture of relevant data from the user device, the location, prior locations of the user device (e.g., as captured by GPS or other known locations where a user device accessed an tag in the system), personal information given by a user, browsing habits and other data gathered from the user device, and other third-party API that have relevant data regarding the user or the user device.

In a further preferred embodiment, a method for delivering unique content to a user device via a MRC, comprising the steps of: detecting the MRC with the user device and determining an identification of a user, the user device, or both; determining whether the identification of the user device contains a unique ID stored in a manifest or any other location on the user device by querying a redirect/identification server; wherein if no unique ID is identified, issuing the unique ID to the user device; determining information about the user based upon the information connected to the unique ID and the unique user record; customizing the content to said user based upon the identification of the user, the user device, or both; and, upon meeting a threshold related to the particular user collecting data, delivering the content to the user device; wherein the content comprises a unique content offer.

In a further embodiment, the method further comprising: modifying the content based upon the occurrence of a trigger.

In a further embodiment, the method further comprising: wherein the unique ID is created by making a determination on if a user and/or user device in the redirect/identification server is unique, and if the answer is "yes," the interface server will request content from the content management software which includes an unissued, unique ID that is only offered one time to one user.

In a further embodiment, the method further comprising: wherein the MRC is selected from the group consisting of: a bar code, a quick response (QR) code, near field communication (NFC) code, radio frequency identification (RFID) code, or combinations thereof. In a further embodiment, the method further comprising: wherein the identification of the user comprises identification of a data, wherein, upon each detection of the MRC, the data is updated. In a further embodiment, the method further comprising: wherein querying a redirect/identification server comprises identification of a data corresponding to the unique ID.

In a further embodiment, the method further comprising: wherein the data is selected from the group consisting of: a date, a time, a GPS location of the machine-readable code, a type of communication device used to scan the machine-readable code, an orientation of a communication device when the machine-readable code was scanned, a type of operating system on a communication device that scanned a tag; and combinations thereof.

In a further embodiment, the method further comprising: wherein the customizable content directs the user device to a Web page, and wherein analytical data from the Web page is collected and consists of the data selected from the group consisting of: time spent on a Web page, purchases made, IP address, personal information input by the user, products viewed, and combinations thereof. In a further embodiment, the method further comprising: wherein data is collected and aggregated every time a user accesses the redirect/identification server, the interface server or the tag. In a further embodiment, the method further comprising: wherein the step of modifying the content is predetermined based on the occurrence of a trigger and stored within a database and is automatically disseminated upon the occurrence of the trigger.

In a further preferred embodiment, a system for displaying a unique content to users at a venue via a user device, the system comprising: a server system having a computer processor and memory; a plurality of tags, each with a MRC, each of the MRCs encoding an address controlled by the server system, each of the tags being operatively mounted within the venue for access by the user devices in the venue; and wherein the computer memory of the server system stores executable code, wherein when executed, enables the server to perform a process comprising the following steps: receiving a request from one user device, the request generated by scanning one of the tags with said user device; determining whether a manifest with a unique ID is associated with said user device or generating a new manifest and assigns it a unique ID to the user device that scanned the tag; collecting a user data associated with the user device, wherein each user device comprises a manifest with a unique ID; generating a targeted advertisement based upon the total number of users to the system; selecting, based upon the user data, the unique content from the content in the database, wherein the customized content provides the unique content, wherein said unique content is stored within said server; wherein upon the occurrence of the total number of users to the system, providing the unique content to the user device; identifying the occurrence of a trigger; and generating a new unique content on said user device based upon the occurrence of the trigger that is unique to the unique certificate.

In a further embodiment, the system wherein upon each subsequent scan of the tag, generating a new unique content within said server for delivery to the user device. In a further embodiment, the system wherein the content is modified based upon an action performed on said user device. In a further embodiment, the system wherein the content is a digital offer. In a further embodiment, the system wherein the digital offer is modified by a provider of said digital offer.

In a further embodiment, the system wherein the trigger is selected from the group consisting of: an action in a game, a score in a game, a charitable donation, a purchase, a predetermined time, inventory, or combinations thereof. In a further embodiment, the system wherein the MRC is printed on a surface. In a further embodiment, the system wherein the MRC is embedded within a surface. In a further embodiment, the system wherein the MRC identifies a specific location via a known location of the MRC, GPS, or both. In a further embodiment, the system wherein the digital offer is modified based upon sharing of the digital offer to at least five additional user devices.

In a further embodiment, the system wherein the customizable content directs the user device to a Web page, and wherein analytical data from the Web page is collected and consists of the data selected from the group consisting of: time spent on a Web page, purchases made, IP address, personal information input by the user, products viewed, cookies, pixels, and combinations thereof. In a further embodiment, the system wherein the user device further receives in-venue metrics via an in-venue metrics API, and which said in-venue metrics are utilized as data or to modify the content. In a further embodiment, the system wherein the user device further receives third-party metrics via a third-party metrics API, and wherein said third-party metrics are utilized as data or to modify the content. In a further embodiment, the system ticket brokerage metrics via a ticket brokerage metrics API, and which said in-venue metrics are utilized as data or to modify the content. In a further embodiment, the system wherein the data includes personal information added by a user.

In a further embodiment, the system wherein the MRC is located within an LCD/LED/e-ink display device embedded or affixed to seating surface, which can be updated in real time. In a further embodiment, the system wherein the MRC is displayed upon a video board located within the venue. In a further embodiment, the system wherein the tag is modified by the occurrence of a trigger. In a further embodiment, the system wherein the trigger is related to an action performed by fan(s) in attendance of an event.

In a further preferred embodiment, a system for generating a unique content to a group of user devices comprising: a server system having a computer processor and memory; a plurality of tags, each with a MRC, each of the MRCs encoding an address controlled by the server system, each of the tags being operatively mounted within the venue for access by the user devices in the venue; and wherein the computer memory of the server system stores executable code, wherein when executed, enables the server to perform a process comprising the following steps: receiving a request from one user device, the request generated by scanning one of the tags with said user device; directing the user device to a tag URL that is uniquely encoded to the tag; receiving at a redirect/identification server, the URL request, and determining whether the user device is new or returning, and informing an interface server of the result; generating an unused unique ID for a new user which is stored in a database; receiving an instruction at an interface server from a target determination process regarding content to be generated; querying the system to determine if a threshold data has been met for deploying the unique content; providing a second URL to the interface server; upon meeting the threshold data, sending the second URL to all user devices who participated in meeting the threshold data; displaying, from said second URL, unique content on said user devices; obtaining a data from said user devices; and upon the occurrence of a trigger, receiving a new URL from said interface server.

In a further preferred embodiment, a method for creating a unique digital offer comprising: detecting a tag with a user device and determining an identification of a user, the user device, or both; determining whether the identification of the user device contains a manifest with a unique ID by querying an interface server; wherein if no manifest with a unique ID is identified, issuing the unique ID to the user device; storing, within a database, the unique digital offer to be generated upon the occurrence of a threshold regarding data capture by the user device or the system as a whole; generating a unique digital offer, said digital offer being unique to the unique ID; and, upon meeting of the threshold, delivering the unique digital offer to said user device.

In a further embodiment, a system for generating a unique content to at least one user device upon meeting a threshold of users to the system comprising: a server system having a computer processor and computer memory; a plurality of machine-readable codes, each of the machine-readable codes encoding an address controlled by the server system, each of the machine-readable codes being operatively mounted within the venue for access by all user devices in the venue; and wherein the computer memory of the server system stores executable code, wherein when executed the executable code enables the server to perform a process comprising the following steps: (i) receiving a request from one user device, the request generated by scanning one of the machine-readable codes with said user device; (ii) directing the user device to a tag URL that is uniquely encoded to the machine-readable code; (iii) receiving at a redirect/identification server the tag URL request, determining a result of whether the at least one user device is new or returning, and informing an interface server of the result; (iv) generating manifest and an unused unique ID for a new user which is stored in a database; (v) receiving an instruction at the interface server from a target determination process regarding mobile content to be generated upon the meeting of the threshold; (vi) providing a second URL to the redirect/identification server; (vii) sending the second URL to the at least one user device; (viii) displaying from said second URL unique content on said at least one user device; (ix) obtaining a data from said at least one user device; and (x) upon an occurrence of a trigger, receiving a new URL from said content management server.

In a further embodiment, a method for creating a unique digital experience based upon meeting a pre-defined threshold of users within a system, comprising: detecting a machine-readable code with a user device and determining an identification of a user, the user device, or both; determining whether the identification of the user device contains a manifest with a unique ID by querying a redirect/identification server; wherein if no manifest with a unique ID is identified, issuing the manifest with a unique ID to the user device; storing within a database the unique ID; determining a threshold of users for the system, wherein unique digital offers are held until the meeting of said threshold; meeting said threshold and generating a unique digital offer, said digital offer being unique to the unique ID; and delivering the unique digital offer to said user device.

In a further embodiment, a system for displaying a unique content to users at a venue via at least one user device, the system comprising: a server system having a computer processor and computer memory; a plurality of machine-readable codes, each of the machine-readable codes encoding an address controlled by the server system, each of the machine-readable codes being operatively mounted within the venue for access by all user devices in the venue; and wherein the computer memory of the server system stores executable code, wherein when executed the executable code enables the server to perform a process comprising the following steps: (i) receiving a request from one user device, the request generated by scanning one of the machine-readable codes with said user device; (ii) determining whether a manifest with a unique ID is associated with said user device or generating a new unique ID to the user device that scanned the machine-readable code; (iii) collecting a user data associated with the user device wherein each user device comprises a unique ID; (iv) selecting, based upon the user data, the unique content from content in the database, wherein the content provides the unique content, wherein said unique content is stored within said server; (v) Setting a threshold for delivery of unique content upon meeting the threshold; (vi) providing the unique content to the user device upon the meeting of the threshold; (vii) identifying a trigger; and (viii) generating a new unique content on said user device based upon the trigger that is unique to the unique ID.

In a further embodiment, a method for delivering unique content to a user device via a machine-readable code comprising the steps of: detecting the machine-readable code with the user device and determining the identification of a user, the user device, or both; determining whether the identification of the user device contains a manifest with a unique ID by querying a redirect/identification server, wherein, if no manifest with a unique is identified, issuing the unique ID to the user device; determining information about the user based upon the information connected to the unique ID stored in the manifest; customizing the unique content to be delivered to said user based upon the identification of the user, the user device, or both; setting a threshold for delivering unique content, and upon meeting the threshold, delivering the unique content to the user device, wherein the unique content comprises a unique mobile content offer.

Other features and advantages of the present invention will become apparent from the following more detailed description, taken in conjunction with the accompanying drawings, which illustrate, by way of example, the principles of the invention.

In a preferred embodiment, a method for delivering dynamic content to a user device via a machine-readable code comprising: (a) in response to scanning a tag (16a) comprising the machine-readable code, receiving a request from a user device (14a) and detecting the presence of a manifest comprising a unique ID, wherein if no unique ID is present, creating a unique ID and associating a record with the unique ID within a database; (b) detecting from the tag (16a) a tag ID and determining: (i) whether a venue exists corresponding to the tag ID; and (ii) whether an event is in progress corresponding to the tag ID; (c) redirecting to a global default target if no venue exists or no event is in progress, and determining if a tag ID is grouped where the venue exists and an event is in progress; (d) counting, via a counting mechanism, the total number of unique IDs scanning a tag within the venue and determining, via the counting mechanism, whether a threshold number of unique IDs have scanned a tag; (e) upon meeting the threshold number, in response to the detecting from the tag ID, obtaining tag ID group information and associating the tag ID with the unique ID; and (f) associating the unique ID and a unique ID record with the tag ID and redirecting a user to an appropriate target.

In a further embodiment, the method further comprising: (d2) providing a first target to the user device when the threshold number is unmet and redirecting to the target upon meeting the threshold number.

In a further embodiment, the method wherein the threshold number is selected from the group consisting of: a total number of unique users on a system at a time t, the total number of unique users accessing a system after a time t, x number of scans corresponding to a unique ID and x number of tags, and combinations thereof. In a further embodiment, the method wherein the total number of unique users on the system at a time t is greater than 1,000. In a further embodiment, the method wherein the total number of unique users on the system after a time t is greater than 1,000.

In a further embodiment, the method wherein redirecting the user device to a new target is redirected through a push notification.

In a further embodiment, the method wherein the machine-readable code is selected from the group consisting of: a barcode, a quick response (QR) code, a near-field communication (NFC) code, a radio-frequency identification (RFID) code, and combinations thereof.

In a further embodiment, the method wherein the target is stored within a database and is automatically redirected upon the occurrence of the event. In a further embodiment, the method wherein the target is selected from the group consisting of: a digital offer and an advertisement.

In a preferred embodiment, a system for displaying unique content to users at a venue via at least one user device, the system comprising: (a) a server system having a computer processor and computer memory; (b) a plurality of machine-readable codes, each of the machine-readable codes encoding an address controlled by the server system, each of the machine-readable codes being operatively mounted within the venue for access by all user devices in the venue; (c) a counting mechanism operably connected to said server system; and (d) wherein the computer memory of the server system stores executable code, wherein when executed the executable code enables the server system to perform a process comprising the following steps: (i) receiving a request from one user device, the request generated by scanning one of the machine-readable codes with said user device; (ii) determining whether a unique ID is associated with said user device or generating a new unique ID to the user device that scanned the machine-readable code and associating said unique ID to a database record; (iii) collecting user data associated with the user device and storing the same within the database record, wherein each user device comprises a unique ID; (iv) setting a threshold for delivery of unique content upon meeting said threshold, said threshold determined by the counting mechanism; and (v) providing the unique content to the user device upon meeting the threshold.

In a further embodiment, the system wherein the threshold is selected from the group consisting of: a total number of unique users on the system at a time t, a total number of users accessing the system after a time t, and combinations thereof.

In a further embodiment, the system wherein upon each subsequent scan of the machine-readable code a new unique content is generated within said server system for delivery to the user device.

In a further embodiment, the system wherein the unique content is a digital offer or an advertisement. In a further embodiment, the system wherein the digital offer is modified by a provider of said digital offer. In a further embodiment, the system wherein a digital offer is provided based upon meeting the threshold and wherein said digital offer may be modified based upon meeting a subsequent threshold.

In a further embodiment, the system wherein the threshold is selected from the group consisting of: an action in a game, a score in a game, a charitable donation, a purchase, a predetermined time, inventory, and combinations thereof.

In a further embodiment, the system wherein the machine-readable code is printed on a surface.

In a further embodiment, the system wherein the machine-readable code is embedded within a surface.

In a further embodiment, the system wherein the machine-readable code identifies a specific location via a known location of the machine-readable code, GPS, or both.

In a further embodiment, the system wherein the user data is selected from the group consisting of: a date, a time, a GPS location of the machine-readable code, a type of communication device used to scan the machine-readable code, an orientation of a communication device when the machine-readable code was scanned, a type of operating system on a communication device that scanned an interactive code, and combinations thereof.

In a further embodiment, the system wherein the unique content directs the user device to a Web page, and wherein analytical data from the Web page is collected and consists of data selected from the group consisting of: time spent on a Web page, purchases made, IP address, personal information input by a user, products viewed, cookies, pixels, and combinations thereof.

In a further embodiment, the system wherein the user device further receives in-venue metrics via an in-venue metrics API and wherein said in-venue metrics are utilized as data or to modify the unique content. In a further embodiment, the system wherein the user device further receives third party metrics via a third party metrics API, and wherein said third party metrics are utilized as data or to modify the unique content. In a further embodiment, the system wherein the user device further receives ticket brokerage metrics via a ticket brokerage metrics API, and which said ticket brokerage metrics are utilized as data or to modify the unique content.

In a further embodiment, the system wherein the user data includes personal information added by a user.

In a further embodiment, the system wherein the machine-readable code is located within an LCD/LED/e-ink display device embedded within or affixed to a surface.

In a further embodiment, the system wherein the machine-readable code is displayed upon a video board located within the venue.

In a further embodiment, the system wherein the machine-readable code is displayed within an LCD/LED/e-ink display which can be updated in real time.

In a further embodiment, the system wherein an event is related to an action performed by fan(s) in attendance of a game.

In a further embodiment, the system wherein the machine-readable code is modified by the occurrence of an event.

In a preferred embodiment, a system for generating unique content to at least one user device upon meeting a threshold of users to the system comprising: (a) a server system having a computer processor and computer memory; (b) a plurality of machine-readable codes, each of the machine-readable codes encoding an address controlled by the server system, each of the machine-readable codes being operatively mounted within a venue for access by all user devices in the venue; and (c) wherein the computer memory of the server system stores executable code, wherein when executed the executable code enables the server system to perform a process comprising the following steps: (i) receiving a request from one user device, the request generated by scanning one of the machine-readable codes with said user device; (ii) directing the user device to a URL that is uniquely encoded to the machine-readable code; (iii) receiving the request at an identification server, determining a result of whether the at least one user device is new or returning, and informing an interface server of the result; (iv) generating an unused unique ID for a new user which is stored in a database; (v) receiving an instruction at the interface server from a target determination process regarding digital content to be generated upon meeting the threshold; (vi) providing a second URL to the identification server; (vii) sending the second URL to the at least one user device; (viii) displaying, from said second URL, unique digital content on said at least one user device; (ix) obtaining a data from said at least one user device; and (x) upon an occurrence of a trigger, receiving a new URL from said interface server.

In a preferred embodiment, a method for distributing dynamic content to a user upon meeting a predefined threshold comprising: (a) detecting a machine-readable code with a user device and determining an identification of a user, the user device, or both; (b) determining whether the identification of the user device contains a unique ID by querying a server to determine the presence of a unique ID; wherein if no unique ID is identified, issuing the unique ID to the user device; (c) storing within a database a record associated with said unique ID; (d) determining a threshold, wherein the threshold is defined as a predetermined number of users for a system, wherein upon meeting the threshold, a digital offer is distributed; (e) meeting said threshold and generating the digital offer to be redirected or pushed to the user device; and (f) delivering the digital offer to said user device.

In a further embodiment, the method wherein the digital offer is unique to the unique ID.

In a further embodiment, the method wherein the threshold is at least 1,000 users.

In a further embodiment, the method wherein the threshold is at least 1,000 users within a geofence.

In a further embodiment, the method wherein the threshold is at least 10,000 users, wherein at least 1,000 users are defined within a first geofence. In a further embodiment, the method wherein the threshold further includes at least x points scored by a team within a game, said game being played within the first geofence.

In a preferred embodiment, a method for distributing dynamic content to a user upon meeting a predefined threshold comprising: (a) detecting a machine-readable code with a user device and determining an identification of a user, the user device, or both; (b) determining whether the identification of the user device contains a unique ID by querying a server to determine the presence of a unique ID; wherein if no unique ID is identified, issuing the unique ID to the user device; (c) storing within a database a record associated with said unique ID; (d) determining a threshold, said threshold comprising scanning of a predetermined number of tags by the user device; (e) meeting said threshold and generating a digital offer to be redirected or pushed to the user device; and (f) delivering the digital offer to said user device.

In a further embodiment, the method wherein the predetermined number of tags is greater than 10.

In a further embodiment, the method wherein the predetermined number of tags is present within one geofence. In a further embodiment, the method wherein the predetermined number of tags is provided via a scavenger hunt, wherein the tags to be scanned are populated within a GUI on the user device.

In a further embodiment, the method wherein the predetermined number of tags comprise scanning of x number of tags dynamically generated on a digital screen during an event, wherein each of said tags dynamically generated on a digital screen is displayed for a finite amount of time.

In a further embodiment, the method wherein a user is directed to a first target and upon meeting the threshold is directed to a second target, said second target delivering a digital offer.

In a preferred embodiment, a method of delivering dynamic content to a plurality of users comprising: (a) scanning, within a system, a tag by a plurality of user devices, said system comprising at least one tag, a server, and a database; (b) counting, via a counting mechanism, the total number of users having scanned a tag within a defined parameter selected from the group consisting of: a time parameter, a geofence parameter, and combinations thereof; (c) wherein the counting mechanism counts only users that are active on the system; and (d) upon a threshold of users being counted by the counting mechanism, providing a digital offer to all users having been counted via the counting mechanism.

In a further embodiment, the method wherein the total number of users is at least 1,000 users active on the system; and wherein the time parameter defines a window of one hour to receive the 1,000 scans. In a further embodiment, the method wherein the geofence parameter is defined as a single venue being defined by a geofence. In a further embodiment, the method wherein the geofence parameter is defined by all venues, then hosing an event. In a further embodiment, the method wherein the geofence parameter is defined as all users not within a venue.

In a preferred embodiment, a method of delivering dynamic content to a plurality of users comprising: (a) scanning a tag by a plurality of users; (b) counting, via a counting mechanism, a total number of users having scanned a tag within a defined parameter; (c) wherein the counting mechanism counts all users scanning any tag within a system within a time threshold; and (d) upon a threshold of users being counting by the counting mechanism, providing a digital offer to all users having been counted via the counting mechanism.

In a further embodiment, the method wherein the total number of users is at least 1,000 users active on the system; and wherein the parameter is a time parameter and wherein the time parameter defines a window of one hour to receive the 1,000 scans.

In a further embodiment, the method wherein the parameter is a geofence parameter and wherein the geofence parameter is defined as a single venue being defined by a geofence. In a further embodiment, the method wherein the geofence parameter is defined by all venues then hosing an event. In a further embodiment, the method wherein the geofence parameter is defined as all users not within a venue.

In a preferred embodiment, a method of delivering dynamic content to a user comprising: (a) scanning a plurality of tags by an individual user device; (b) defining a rule, wherein the individual user device scans x number of tags within a defined parameter; (c) upon scanning of a first and nth tag by the individual user device, updating a database to identify the first and nth tags being scanned; and (d) upon meeting the rule by meeting the x number of tags scanned within the defined parameter, delivering the dynamic content.

In a preferred embodiment, a method of delivering dynamic content to at least one user comprising: (a) scanning a tag within a system; (b) defining a rule, wherein dynamic content shall be delivered upon the occurrence of a trigger; (c) directing the user to a first target; and (d) redirecting the user to a second target, being the dynamic content upon the occurrence of the trigger.

In a preferred embodiment, a system for delivering dynamic content to at least one user comprising: (a) a server system comprising at least one server, at least one database, and at least one tag, said tag comprising a tag ID, said tag ID being a unique identifier of said tag; (b) defining a rule on said system, wherein dynamic content is delivered to the at least one user; (c) the dynamic content being stored on said database; and (d) a counting mechanism suitable to count the at least one user within the system; wherein the system performs the following steps: (i) receiving, via a tag, a unique ID from a user device; (ii) defining a time of scanning the tag; (iii) determining a geofence location of the user device at the time of scanning the tag; (iv) updating the counting mechanism to identify the number of users active on the system having scanned a tag; and (v) deploying dynamic content to all users being defined as on the system within the counting mechanism.

DETAILED DESCRIPTION OF THE INVENTION

Figure 1:
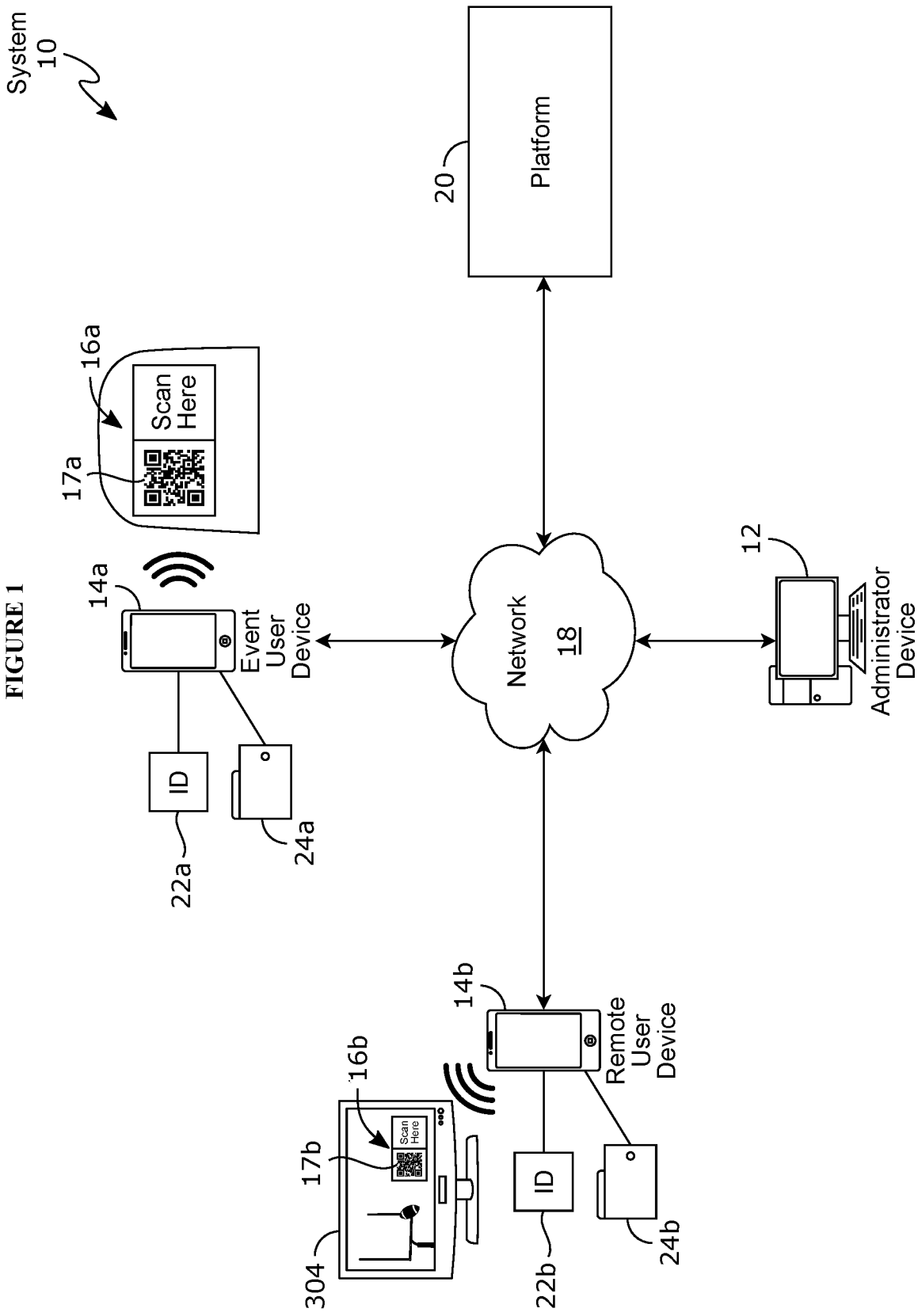
FIG. 1 depicts an embodiment of a system for user device generated interactions with a system and platform for accessing and viewing targets, such as content and digital offers.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

The embodiments detailed herein and as depicted in the drawing figures illustrate several embodiments of the invention, which is directed to a method and system for generating unique content to a plurality of users based upon meeting a threshold requirement upon the system. A threshold requirement here typically requires some rule or metric to be met, often a plurality of users, a plurality of accesses to a tag, whether done by a plurality of users and user devices or a single user device. The unique content provided to the users can then be further modified, as it is unique to each user, wherein the system contains the ability to alter provided unique content based on data collected from user(s) input and other factors such as third-party data in real time. Content shall mean any content generated by the system and delivered via a URL, Web app, or other feature as detailed herein, to the user device, or to a digital wallet. The content may be visual content, a replay, an advertisement, or it may be a coupon or a redemption code or something of value, as non-limiting examples.

As used herein, the below terms will have the following meanings as may be supplemented elsewhere in this specification:

As used in this application, the words "a," "an," and "one" are defined to include one or more of the referenced items unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

ADDRESS: Code used to direct a user device, browser, Web app, progressive Web app, administrator device, server, database, API, tool, software, etc., to a resource within the system or a network. Non-limiting examples of addresses include a uniform resource identifier (URI) or a uniform resource locator (URL).

ADMINISTRATOR: The individual or group of individuals with the ability to control and set rules and parameters within the system. This could be a third-party administrator, the proprietor, the venue, the owner of the tags, the team or performer participating in the event, a designated employee of any of the foregoing, etc.

ADMINISTRATOR DEVICE: Any type of mobile or non-mobile processing device such as a desktop computer, handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element that is accessible only to an administrator or proprietor or an employee designated by the administrator or proprietor.

ANALYTICS OR ANALYTICAL DATA: Data collected by the system or retrieved by the system via an API call to an external server or database. Non-limiting examples of analytical data include date, time, GPS location, personal identifying information, etc.

APPLICATION PROGRAMMING INTERFACE ("API"): An application programming interface or programming code that enables data transmission within the system, between the system's server and an external server or between one software product and another. Non-limiting examples of API connections to the system may be third-party vendor databases such as ticketing sales platforms, e-commerce sites such as merchandise sales, social media sites, or any other third-party software product that makes their API available for use by others.

API CALL—Computer code used by the system software to access data, server software or other applications within the system or external to the system, acting as an intermediary between any two devices or servers that want to connect with each other for a specified task. As used herein, API can mean (i) representational state transfer or Rest (RESTful) API; (ii) Simple Object Access Protocol ("SOAP") API; (iii) extensible markup language-Remote Procedure Calls ("XML-RPC"); (iv) JSON Remote Procedure Calls ("JSON-RPC), (v) open API; (vi) partner API; (viii) internal or private API; (ix) composite API; or (x) any other API that is generally known, or will be come to be known in the art. Thus, the system frequently uses an API, or sends an API request, to an internal or external program, server or database to deliver requested information.

BLOCKCHAIN: Any digitally distributed, decentralized, public or private ledger that exists across a network such as those offered by the providers including but not limited to Ethereum, Binance Smart Chain, Polkadot, Flow by Dapper Labs, EOS, Tron, Tezos, WAX, Theta, etc.

BROWSER APPLICATION: An application that runs within the Web browser of a User Device or Computer. The instructions or executable code, typically written in a combination of HTML and JavaScript, is embedded within the Web page that is downloaded from a Web site.

COMPUTER: May be any type of computer such as a laptop computer, desktop computer, tablet, and the like, and includes the appropriate hardware, firmware, and software to enable the computer to function as intended.

CONTENT: Any type of information, images, videos, etc. Non-limiting examples of content can be a video file, an image file, text, executable code, a digital offer, a digital coupon, a digital wallet offer, an AR, VR or mixed reality filter, a game, a poll, an app, an NFT, etc. Content can be specifically formatted for optimal viewing on a user device.

CRYPTO CURRENCY: Any digital currency in which transactions are verified and records maintained on a distributed ledger such as blockchain, for example, Bitcoin, Ethereum, Cardano, Binance Coin, Tether, Solana, XRP, Dodgecoin, etc.

DATABASE MANAGEMENT SYSTEM: A software package designed to define, manipulate, retrieve and manage data in a database, or any other generally accepted definition known to those skilled in the art.

DIGITAL OFFER: Any incentive or reward, for example an incentive to purchase at a discounted price or a free giveaway, offered by a proprietor and delivered to users from a server to a user device through a variety of channels. A Digital offer can be code stored in the user's digital wallet, a MRC displayed in Web browser and presented to a proprietor for redemption, an e-mail with a unique redemption code, a text message, SMS/MMS, push notification or socket notification with a unique redemption code. Digital offers can be stored anywhere on a user device or can be downloaded or turned into physical offers by printing. Digital offers can be limited to a particular user, or a user may share the digital offer to other users. If a digital offer is shared, the same offer can be shared to multiple other users, or the digital offer can be modified by the system when it is shared. Digital offers can also be associated with a unique code that is stored in a database on a server internal or external to the system.

DIGITAL WALLET: A software-based system that securely stores users' information such as payment information, passwords, digital certificates, digital coupons, crypto currency, tokens, NFTs, digital ID such as a digital driver's license or passport, etc. A digital wallet can be a blockchain or crypto currency wallet. A digital wallet can be stored locally on any user device or can be cloud based and accessed by a user device. Digital wallet can also mean digital storage in general on any user device or computer. Digital wallet can also be referred to as a mobile wallet.

DISTRIBUTED DATABASE SYSTEM: Any database that consists of two or more files located in different sites either on the same network or on entirely different networks.

DISTRIBUTED LEDGER: Any database that is consensually shared and synchronized across multiple sites, institutions, or geographies, accessible by multiple people.

DATA SERVER OR SERVER: Any form of electronic device or plurality of devices having at least one computer processor, e.g., a central processing unit (CPU), and some form of computer memory having a capability to store data, as is well known in the art. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, a smart watch, smart glasses, a wearable device or an implantable device or any form of electronic device capable of functioning as described herein.

DYNAMIC ELEMENT: An element that is updated, altered, customized, etc., in response to a change in the status of a metric, trigger, or any other datapoint as determined by the system. A non-limiting example of a dynamic element is the score of a game. If a goal is completed, then the score is updated to reflect this change.

EVENT: Non-limiting examples of an event include a professional, amateur or intramural sporting events (i.e., football, baseball, hockey, basketball, soccer, rugby or cricket game, tennis or golf match, track and field or figure skating event or automobile race), a theatrical performance (play, musical or opera), a musical concert, elementary school, middle school, high school, college or university event, a service or ceremony (i.e., religious or worship), a tradeshow or conference, guided or self-guided tours (museums, galleries and historical site), time spent in a venue such as a visit to a zoo or amusement park, etc.

FAN PORTAL: A GUI, such as a homepage, displayed in the browser of a user device that provides links or access to other pages/modules via buttons or other means of selecting options from a menu of choices. The fan portal can also be used for viewing content and receiving digital offers.

INTERFACE SERVER: Within the system, a program, executable code or API stored on a physical server, cloud storage system or in a serverless environment such as Amazon Web Services, which is capable of communicating with other servers, databases and API's internal or external to the system. The interface server is able to make and receive calls, request and receive data, or execute other functions within systems. The interface server is also capable of running AI and/or utilizing machine learning.

GEOFENCE: A virtual perimeter for a real-world geographic area or an area in or around a venue.

GUI OR GRAPHICAL USER INTERFACE: A graphical interface to enable interactions between a user and the user's device, such as but not limited to an interface to the Web app.

JUMBO SCREEN: Any display within a venue visible to users attending an event at a venue. The jumbo screen can be one display or multiple displays within the venue that can be controlled by the venue. Jumbo screen may also be known as a jumbotron.

LOCATION: An area whose perimeter or parameters are defined in an abstract way without boundaries that are clearly visible to users or proprietors. Non-limiting examples of a location include a town, city, state, country, region, continent, time zone, or geofenced area.

MACHINE-READABLE CODE ("MRC"): A barcode, a quick response (QR) code, near-field communication (NFC) code, radio-frequency identification (RFID) code, universal product code (UPC), machine readable graphics (e.g., having a pattern, matrix, or the like) coding, instructions coded on a chip, or combinations thereof. A MRC may be may be included into (i) a tag that is mounted to a surface, (ii) identification badges such as, for example, student identification badges, employment identification badges, concert badges, and the like, (iii) merchandise such as t-shirts, sweatshirts, hats, mugs, glasses, posters, CD's, and the like, (iv) a piece of paper, cardstock, or plastic that is handed to users, (v) a video stream viewed over the internet or network television channel, (vi) an LCD/LED/e ink display device embedded, attached or affixed to a surface.

MANIFEST: A file containing metadata for a group of accompanying files that are part of the system that instruct the user device how to handle the system when it is started.

MINTING: Uniquely publishing a token on the blockchain to make it purchasable, salable, or tradeable.

NON-FUNGIBLE TOKEN ("NFT"): A non-interchangeable unit of data stored on a digital ledger, such as but not limited to blockchain, that can be purchased, sold, auctioned, and traded. As used herein, NFT includes the contract and subject matter associated with the NFT and can also mean semi-fungible token or fractional NFT. Non-limiting examples of the smart contracts that could govern a NFT include (i) 1/1 NFTs—known as ERC-721 tokens on Ethereum and Polygon, KIP17 on the Klatyn blockchain; (ii) Semi-fungible NFTs—known as ERC-1155 tokens on Ethereum and Polygon, KIP37 on Klatyn.

NFT MARKETPLACE: A platform where NFTs can be stored, displayed, bought, sold, traded, auctioned and in some cases minted.

PROPRIETOR: Any person or entity who purchases, subscribes to, or otherwise uses the system and/or platform and who is not a user. A Proprietor may or may not have administrative privileges to the system. Non-limiting examples of proprietors include, venue owners, event promoters, teams, performers, theatre troupes, religious organizations, educational institutions (i.e., elementary school, middle school, high school, college, university), restaurants, bars, retail establishments, amusement parks, museums, art galleries, advertisers, media outlets (i.e., network television, cable television, radio, internet broadcasts), hospitals and health care systems, ticketing platforms, airlines, ride share services, etc.

PROPRIETOR PORTAL: An access point for a proprietor to enter the system and/or platform typically displayed in a browser.

RECORD: Information that is stored in an electronic or other intangible medium without limitations on how the data is structured.

REDIRECT/IDENTIFICATION SERVER: The server within the system that makes a determination on if a user and/or user device that has entered the system is unique, by locating the manifest stored on a user device and if a manifest exists, associating the unique ID stored in the manifest on the user device with the database of known unique ID's stored on the redirect/identification server, or for confirming other data based on one or more requests to the redirect/identification server.

REDIRECT URL: An address generated by a server, such as the redirect/identification server or the interface server, in response to an incoming request that points the browser on a user device to a different target.

RESOURCE RECORD: A database record associated with a tag ID.

REQUEST: A message sent by one device to another (e.g., phone to server, server to server, computer to server, server to database, etc.) using an address to send the request. For example, upon selecting from the options available in the Web browser, the selection is coded into a request that the Web browser sends to the server via an address. The request typically provides instructions to the server. Non-limiting examples of a request can be—GET, POST, PUT, DELETE, CONNECT, OPTIONS.

RULE: A set of conditional statements that tells the system how to react to a particular situation. Rules can be preprogrammed into the system or can be set or changed by an administrator or proprietor.

SYSTEM: The network, tags, digital seat platform, etc.

TAG: A physical (e.g., tangible) form, a digital (e.g., virtual/intangible) form, or may be combinations of both forms that contains an MRC. Physical versions of tags may be constructed from diverse types of materials. The MRC may be printed, etched, or fabricated onto the tag materials such as paper, glass, plastic, metal, fabric, and the like as a few nonlimiting examples. In the case of tags that contain MRC's that are NFC or RFID, the tags may be adhered to, attached to, embedded in, or fabricated on (or combinations thereof) a natural or manmade material such as metal (e.g., aluminum, stainless steel), wood, polymer (e.g., plastic), film, glass, and combinations thereof. The material may then be incorporated into or affixed (e.g., adhesive or other form of attachment) to an object or location. A tag may be printed on a single or multiple use badge or ticket. Digital tags may include LED/LCD screens or a designated location within a video stream in which the MRC is located.

TAG ID: A unique identifier for the MRC affixed to the tag. The unique identifier can be any combination of letters, numbers, and symbols. The tag ID is stored in a database on a server and is coded with information specific to the location of the tag. For example, the tag ID might generally identify the geographic location of the tag (i.e., the United States, Pa. and/or Philadelphia), the general venue location of the tag (i.e., Fenway Park, Madison Square Garden, Carnegie Hall, The Natural History Museum), the specific location of the tag within the venue (i.e., Section A, Row 1, Seat 10, next to Van Gogh's "Starry Night"), or any combination of information.

TAG URL: A unique address assigned to the MRC on each tag that may optionally include the tag ID.

TARGET: A Web page, file, address, GUI, Web app, progressive Web app, portal, content or digital offer delivered to a user device. Those skilled in the art may also refer to a target as an endpoint.

TARGET DETERMINATION PROCESS: The process described in FIG. 5.

TARGET ID: A unique identifier for the Target. The unique identifier can be any combination of letters, numbers and/or symbols that can be stored in a database, on a server, and/or both. The target ID allows the platform to distinguish one target from another.

TICKETING PLATFORM: Both the primary ticketing platform and the secondary ticketing platform.

TRIGGER: The magnitude or condition that must be reached for a certain result to materialize. Triggers can be determined either by the system, an administrator or a proprietor. Non-limiting examples of a trigger can be the start or end of an event, something of significance that occurs during the event (i.e., the 10th goal scored, the first encore by a musical act), a single user completing a certain task, or N-number of users completing a task.

TOKEN: A digital asset that is stored securely on the blockchain, representing a tradeable asset.

TOOLS: Cookies, pixels, widgets, plug-ins, etc.

UNIQUE ID: A unique identifier for the user device. The unique identifier can be any combination of letters, numbers and/or symbols, cookies, digital credentials or it can be a digital certificate such as TLS, SSL, code signing certificate, client certificate, etc. . . . . The unique ID can be stored on the user device in any location on the user device such as the manifest, local storage or digital wallet, in a database on a server, and/or both, and is used to associate the user device with the unique user record stored in a database on a server in the system.

UNIQUE IDENTIFYING INFORMATION: Personal information and demographics collected about a particular user's such as name, address, phone number, e-mail address, credit card information, gender, marital status, academic affiliation (student, faculty, alumni), driver's license number, age, username, password, pin number, social security number, bank account number, salary, etc.

USER DEVICE: Any type of mobile processing device such as a handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element.

USER/DEVICE ID RECORD: A record stored within a database on a server that contains the unique ID and unique identifying information associated with that unique ID for each user that accesses the system. The user/device record can contain an unlimited amount of information about the user device and presumably the user who owns the user device such as, but not limited to a history of events attended, digital offers used, gambling wagers made, NFTs minted or purchased, venues or locations visited, concession or merchandise purchases, donations made, incident reports, tags scanned, other actions taken, etc. This may further include certain information related to demographics, event attendance history, purchasing history) as well as information about the user device (type of device, GPS location of the device when is scans an MRC).

VENUE: Any physical location with defined perimeters and parameters such as a stadium, arena, court, track, concert hall, theatre, course, museum, restaurant, place of worship (church, synagogue, temple, mosque, etc.), historical site, cultural site, amusement park, zoo, aquarium, conference center or any other place where events are held or users gather. Venues can also be hotel rooms, cruise ships, trains, airplanes, schools (elementary, middle or high school) or a college campus or dorm.

WEB APP: Executable code that is stored on a remote server and delivered via the system or a network to a browser interface on a user device. The Web app may facilitate communication between the user device and one or more servers such as the redirect/identification server or the interface server.

The embodiments herein are directed toward a system and methods for provide unique content based upon meeting a particular threshold for release of the content. This and other elements can be performed on the system as detailed in the following embodiments. A high-level overview of an exemplary system (10) is shown in FIG. 1. The system (10) may include an administrator device (12), a platform (20), a user device (14a) associated with an event user (e.g., physically at the event/in the venue), a user device (14b) associated with a remote user (e.g., not necessarily at the event/in the venue), a plurality of tags (16a, 16b) and one or more networks (18). Generally, each user device (14a, 14b) may be used to scan, read, or otherwise detect (collectively "scan") machine-readable code ("MRC") (17a, 17b) associated with a respective tag (16a, 16b). The act of scanning a tag (16a, 16b)/MRC (17a, 17b) initiates communications between the user device (14a, 14b) that scanned the tag (16a, 16b) and the platform (20), which may result in the rendering of a Web page or the like (e.g., related to the event) by a Web browser and/or other application running on the user device (14a, 14b). Communications between user devices (14a, 14b) and platform (20) is typically via one or more networks (18), which may include, without limitation, the Internet, mobile networks, cloud-based platforms, or combinations thereof.

A proprietor may use a network of encoded tags (16a, 16b) to identify points of interest (e.g., locations, objects, people, etc.). The number of tags (16a, 16b) in the network and placement of tags on, in, or near points of interest is at the discretion of the proprietor to fit its particular assets and needs. Further, a proprietor may add to or subtract from the number of tags (16a, 16b) in the network at will. Thus, the number of tags (16a, 16b) in a proprietor's network may be dynamic, either more or less than an original network of tags. Each tag (16a, 16b) in the network of tags has a unique identifier (tag ID), which may be used to identify a particular point of interest. For example, a tag (16a, 16b) may be situated on or near a seat in a stadium, and the user who purchased a ticket to sit in that seat is the "limited owner" or renter of that seat for a particular event. In certain embodiments, it may be possible to have multiple copies of the same tag, each with the same tag ID, in locations where multiple scans would be desirable at the same time by multiple users. Thus, at the entrance to a stadium, a plurality of tags could be located at different entrance points, each having the same tag ID.

As is implied in FIG. 1, a certain number of tags (16a) may be present at the venue ("in-venue tag"), and additional one or more tags (16b) may be remote from the venue ("remote tag") where the MRC (17b) is displayed in/on a video transmission, signal, or the like, or on a Web page associated with the event, venue, and/or television network, as a few non-limiting examples. Of course, there is the possibility that a user at the event/in the venue scans the remote tag (16b) with his/her user device (14a). Each user device (14a, 14b) may also include, or may eventually include, a unique identifier (22a, 22b) to uniquely identify the user device (14a, 14b) and a digital wallet (24a, 24b) to securely store sensitive information such as a driver's licenses, account information (e.g., banks, crypto currencies, credit cards), titles, tokens, tickets, vouchers, coupons, other digital file (301a, 301b), and the like.

The proprietor may also access platform (20), albeit via the administrator device (12) and one or more networks (18). The administrative device may be located at the venue, or it may be at a location remote from the venue. Generally, the proprietor may access a proprietor portal (FIG. 3 at [322]) hosted by platform (20) to perform administrative and/or other activities such as determining what content (or other) will be sent to the user device (14a, 14b) in response to scanning a tag (16a, 16b).

In addition to hosting the proprietor portal, platform (20) may host a variety of other services including, without limitation, event user and remote user access to content associated with the event, venue, proprietor, and the like. As such, platform (20) may include, or may include access to, one or more servers, databases, application programming interfaces (APIs), artificial intelligence/machine learning algorithms, other algorithms, code, blockchains, blockchain platforms, geofences, third-party integrations, times stamp, and more, which is detailed below, with reference to accompanying figures.

Figure 2:
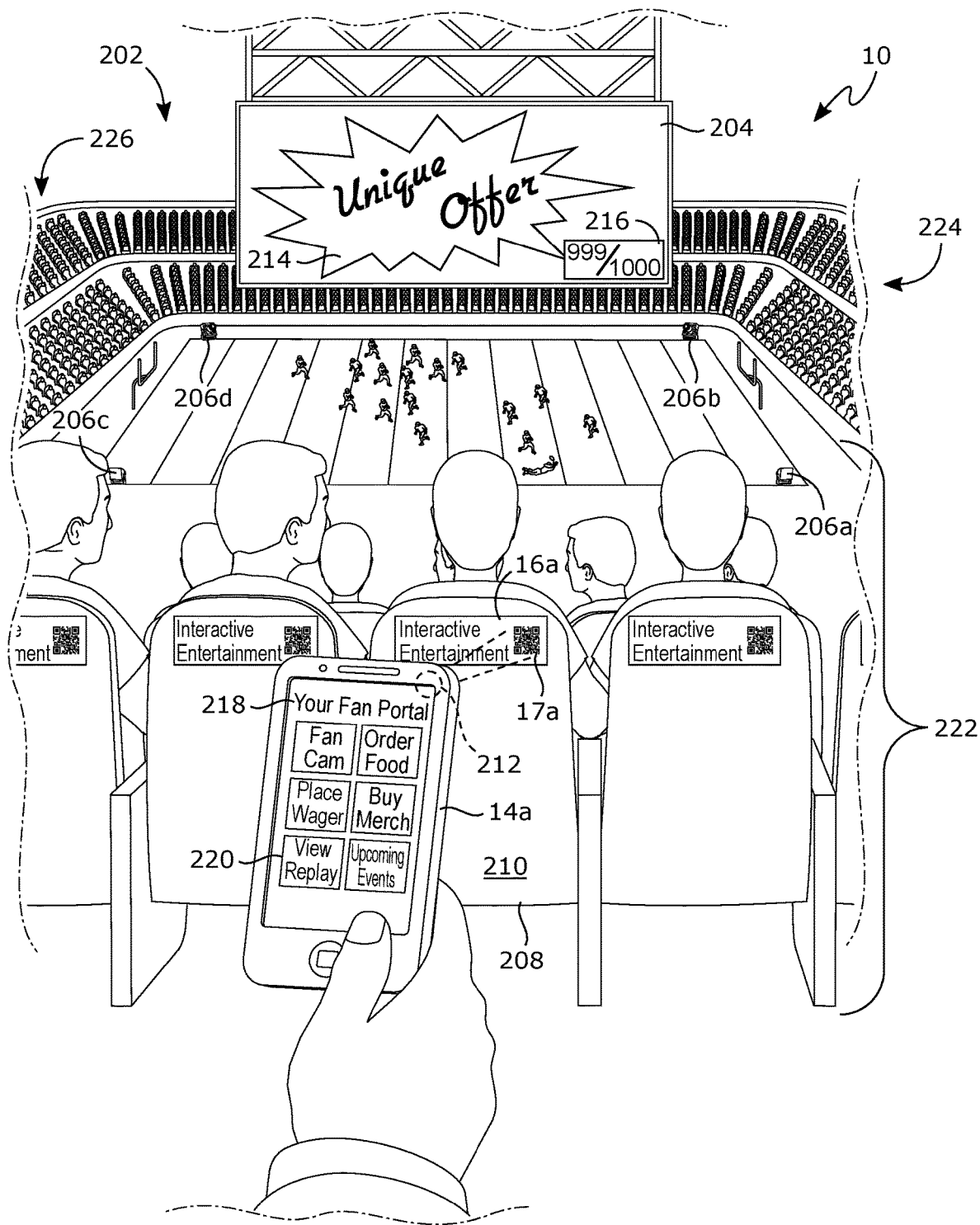
FIG. 2 depicts a stadium comprising a plurality of video cameras and a user device that is accessing a user portal including access to content such as video, augmented video playback, and digital offers.

FIG. 2 shows an exemplary venue (202), which includes a portion of system (10) shown in FIG. 1. In this case, the venue (202) is a football stadium including a jumbo screen (204), recording devices (206a, 206b, 206c, 206d), seats (208), and a plurality of tags such as tag (16a). Although a stadium is shown, the venue (202) can be any venue: small, large, indoor, outdoor, permanent, temporary, one structure, several structures, an entire city, and variations thereof. Thus, a venue (202) can be any area or space occupied by or intended for something, and as such associated amenities and accoutrements may drastically vary from venue to venue. In this example, the stadium has jumbo screen (204), which may display a wide variety of video content as is customary for a football game, though such display screen is not necessary for functionality of the system. The stadium also includes optional recording devices (206a, 206b, 206c, 206d) such as video cameras for recording the football game and other activity, which is also customary for this type of venue (202). Likewise, an event may be any event including sporting events, artistic performances, trade shows, conferences, ceremonies, services, self-guided tours (e.g., at museums, historic sites), and zoos as a few non-limiting examples. Notably, museums, historic sites, zoos, and similar examples may be both the venue and the event or house the event.

In the example of FIG. 2, each seat (208) has a seatback (210) with a tag (e.g., 16a) disposed thereon. In this way, event users can easily see a tag (e.g., 16a) directly in front of them while they are sitting in their seats (208). Thus, the tag (e.g., 16a) that the event user sees is associated with the seat (208) in which the user is sitting. Tag association with a particular seat (208) is desirable in embodiments that take advantage of knowing the event user's seat location such as for food or merchandise delivery directly to the seat (208), as non-limiting examples. In-venue tags (e.g., 16a), however, are not limited to being positioned on seatbacks (210); they may be placed in a wide variety of locations within a venue (202). For example, if in-venue tags (16a) are associated with particular seats (208), they may be placed in any other location on or near the associated seat (208) such as an arm rest, a cup holder, on the seat (208) next to the event user's leg, on the ground, or on a structure near the seat (208) such as a wall, a pillar, or the like. It should be noted that in-venue tags (16a) may be associated with other locations/points of interest, and thus may be placed at or near the locations/points of interest such as entrances, levels, sections, isles, loge seats, individual people (e.g., with a tagged badge, tagged ticket, or the like), restrooms, various additional possibilities, or combinations thereof. Therefore, while one example of in-venue tag (16a) placement is illustrated in FIG. 2, in-venue tag (16a) placement should be broadly construed to include any placement suitable for use as described herein. Tags (16a) may be associated with one or more groupings, for example, by a section, (222, 224, or 226), wherein grouping of tags (16a) may provide certain benefits in the various embodiments detailed herein. Alternative placement schemes that may be devised by one skilled in the art, consistent with the teachings of the present invention, should be considered within the scope of the present disclosure.

As compared to an in-venue tag, in certain embodiments, it may be suitable to include one or more mobile tags. A mobile tag may be located within a movable device, for example a vehicle, a bike, a boat, train, airplane, etc. A tag on such movable devices will need to capture the GPS from the user device at the moment of capture to identify a location. A movable tag can be accessed several times in a series of time (e.g., minutes or seconds) and generate a different GPS location each time a user device scans the tag (or queries a server) and allows the system to identify the movement of the user device.

As was mentioned with respect to FIG. 1, each tag (16a, 16b) in the system (10) has a machine-readable code (17a, 17b) associated therewith. The term machine-readable code ("MRC") as used herein should be broadly construed to include "graphics" type codes such as quick response (QR) codes, universal product code (UPC), snapcodes, and/or any other type of machine-readable graphics (e.g., having a pattern, matrix, or the like) coding known in the art or later developed. Importantly, as used herein, the term machine-readable code/MRC should also be construed to include "chip" technologies that store data on a chip such as, without limitation, near-field communication (NFC) and radio-frequency identification (RFID) technologies, as is known in the art or is later developed. Thus, MRC can be read, scanned, detected or otherwise decoded (collectively, "scanned") by an appropriately enabled (e.g., camera, QR scanner, and/or NFC reader [212]) user device (14a, 14b).

In-venue tags (16a) may be physical (e.g., tangible), digital (e.g., virtual/intangible), or combinations of both forms. Physical tags may be constructed from diverse types of materials. In the case of tags having one or more graphical/matrix type codes such as QR codes, barcodes, and the like, the code may be printed, etched, fabricated, or the like on materials such as paper, glass, plastic, metal, fabric, and the like, as a few nonlimiting examples. In the case of NFC/RFID enabled tags, chips/antennae may be adhered to, attached to, embedded in, or fabricated on (or combinations thereof) a natural or manufactured material such as metal (e.g., aluminum, stainless steel), semiconductor, wood, polymer (e.g., plastic), film, glass, and combinations thereof, without limitation. The material may be incorporated into or affixed (e.g., adhesive, or other form of attachment) where desired. Digital tags may be displayed on a screen or communicated via radio waves. In the case of QR codes, barcodes, and the like, the graphical code may be displayed on a display screen such as the jumbo screen (204) or a display screen associated with the event user's seat (208), other locations/point of interest, or combinations thereof. Thus, the in-venue tag (16a) may be a video display, such as LCD, LED, e-ink, or other visual display and/or text accompanying the MRC (17a). In fact, most, if not all, remote tags (16b) will be a display screen such as on a television screen, computer screen, appliance screen, and the like, having the MRC (e.g., 17b) displayed thereon, or text on the display screen identifying the MRC (17b), although embodiments are not limited thereto.

Information encoded on or in each tag in the system (10) may include an address to direct a request (e.g., for a Web page) from the user device (14a, 14b) to a server or the like on the network (18) such as a server on platform (20). The address may be in the form of a uniform resource identifier (URI) such as a uniform resource locator (URL), according to a non-limiting embodiment. In this way, when the user scans the tag (16a, 16b) with the user device (14a, 14b), the user device (14a, 14b) sends a request to the appropriate network (18) location. In the example shown in FIG. 3, when the event user uses his/her user device (14a) to scan tag (16a), the event user device (14a) obtains an address from the MRC (17a) associated with the scanned tag (16a) and sends a request via the network (18) to the address destination. As one example, the address is a URL that causes the event user device (14a) to send a request to a redirect/identification server (302), on platform (20), which receives the request. Similarly, when the remote user uses his/her user device (14b) to scan the MRC (17b) on a screen (304), a similar URL is obtained which causes the request from the remote user device (14b) to be sent to the redirect/identification server (302), which receives the request.

In a typical embodiment, each tag (16a, 16b) in the plurality has a unique tag identification number (i.e., "tag ID"), which may be appended to the URI/URL, although embodiments are not so limited. The tag ID may be used by the platform (20) for several reasons, one of which is to identify a point of interest/location associated with the tag (14a, 14b) via a tag ID lookup. For example, when a request comes from the event user device (14a), the platform (20) knows that the request came from within the venue (202) and is associated with the seat (208) in which the event user is sitting. And when the request comes from the remote user device (14*b*), the platform (20) knows that the request is in response to scanning a tag (e.g., 16*b*/MRC 17*b*) in transmission, on a Web page, or the like, and the platform (20) knows which transmission/Web page is associated with the scanned tag (16*b*). In an embodiment, the tag ID may be appended to the URL (or URI) such as by one or more parameters, pattern matching techniques, or other such mechanism for encoding information in a URI, URL and/or browser request.

Figure 3:
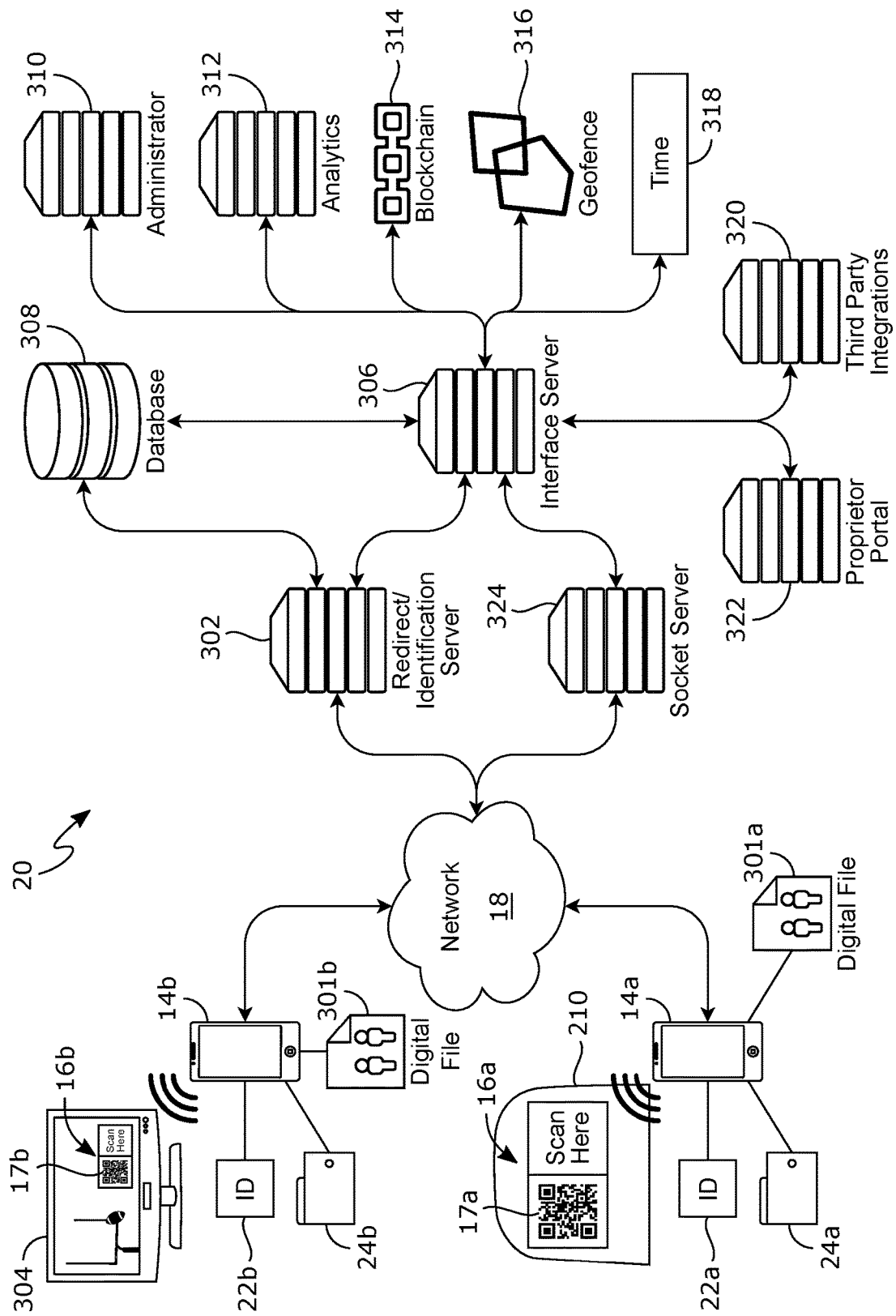
FIG. 3 depicts an embodiment of a system for accessing target information from a user device from within a venue or outside of a venue and various back-end platforms for implementing certain target information or for delivering content to the user device.

FIG. 3 details an exemplary infrastructure that may be used by platform (20) although infrastructures are not limited thereto. This infrastructure may include the redirect/identification server (302), an interface server (306), a database (308), an administration server (310), an analytics server (312), a blockchain, access to a blockchain, or both (314), a geofence (316) a timestamp (318), one or more third party integrations (320), the proprietor portal (322), and a socket server (324). Generally, user device (14*a*, 14*b*) communicates with the platform (20) via redirect/identification server (302) as was previously described. Redirect/identification server (302), accept requests from user devices (14*a*, 14*b*), sends responses to user devices (14*a*, 14*b*), and performs various other methods as described herein. As one non-limiting example, the redirect/identification server (302) may forward information (e.g., URLs, parameters, etc.,) from user device (14*a*, 14*b*) requests to the interface server (306). The interface server (306) manages most, if not all the tasks involved with processing requests, such as handing off/directing tasks, functions, calls, and the like where needed. The interface server (306) may also return request responses to the redirect/identification server (302). If a request came from a user device (14*a* or 14*b*), then the redirect/identification server (302) forwards the response to the requesting user device (14*a* or 14*b*). Examples of tasks, functions, calls, and the like that the interface server (306) may hand off include, without limitation, database (308)/blockchain storage, lookups, etc., administrative and backend tasks/functions to the administration server (310), analytical tasks/functions to the analytics server (312), geolocation tasks/functions (316), time/timestamps (318), API calls to third-party servers for third party integrations (320) and establishing socket connections via socket server (324).

Figure 4:
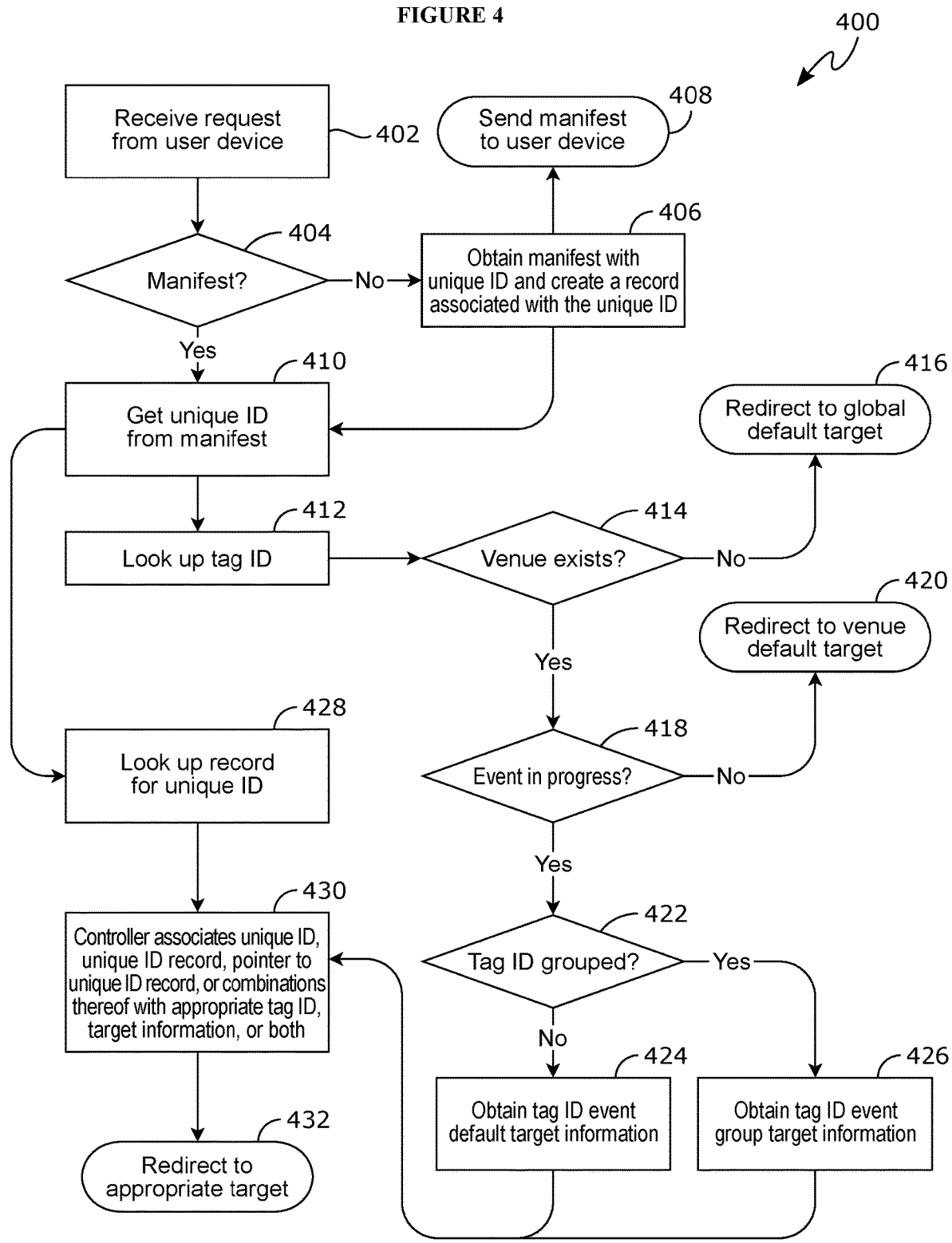
FIG. 4 depicts an embodiment of a system for identifying and using information particular to a user device and/or to a tag for directing the user device to an appropriate target.

Referring to FIGS. 3 and 4 together and using the request from event user device (16*a*) as an example, a method (400) may begin with the redirect/identification server (302) receiving the request (step 402) from the event user device (14*a*). From there, the redirect/identification server (302) may check to see if the event user device (14*a*) has a manifest (containing the unique ID, or just the unique ID alone) loaded thereon (step 404). If no, the redirect/identification server (302) may obtain a manifest and assign a unique ID (e.g., from database [308]) for the event user device (14*a*, step 406). The manifest includes a unique ID to identify the event user device (14*a*) with an identifier that is not shared with any other user device (e.g., 14*b*). The redirect/identification server (302) will also cause the unique ID for the event user device (14*a*) to be stored in a database such, as database (308), as is appropriate for the database management system (step 406). As used herein, the term "record" refers to information that is stored in an electronic or other intangible medium without limitations on how the data is structured. A record may include and/or point to related data. For example, a record for a unique ID may include the unique ID and any other data related thereto, which may be stored in database (308) or other appropriate data storage. After obtaining the manifest and/or the unique ID, the redirect/identification server (302) may then send the manifest together with the unique ID to the event user device (14*a*, step 408), which may be maintained on the event user device (14*a*) in a digital wallet, other secure repository, or both. At step (410), the redirect/identification server (302) may maintain a copy of the unique ID for further use in the method (400), other methods described herein, or both. If the event user device (14*a*) already has a manifest (step 404, yes), the redirect/identification server (302) obtains the unique ID from the manifest (step 410). In an embodiment, the redirect/identification server (302) may also obtain data such as current time, date, location, etc. from the event user device (14*a*), manifest, request, or combinations thereof at step (410).

In an embodiment, the redirect/identification server (302) may pass information needed to further method (400). For example, the tag ID may be passed to the interface server (306) for a tag ID lookup (step 412), such as in database (308), the administration server (310) and/or any other suitable database or server. In this instance, the redirect/identification server (302) obtained the tag ID from the request made by the event user device (14*a*). In an embodiment, the tag ID is appended to the URL, and thus the entire URL, or a portion thereof, may be passed to the interface server (306) for use in looking up the tag ID. Looking up the tag ID provides information about the venue (202) and/or event. To clarify, when a particular venue (202) installs tags (16*a*) and/or uses tags (16*b*), the tag IDs for the installed/used tags (16*a*, 16*b*) are associated with the point/location of interest and the particular venue (202). Thus, if a tag is installed proximate seat 1, row A, section 100, database (308) information associates the installed tag's (16*a*) tag ID and that particular seat (208), which is in that particular venue (202). Since the tag ID is known to belong to a particular venue (202), the interface server (306), the administration server (310) via the interface server (306), any other suitable server, or combinations thereof makes a series of determinations using the tag ID, which was received in response to a request from a user device (14*a*, 14*b*) prompted by scanning the tag (16*a*, 16*b*). One determination is if the venue (202) is actively implementing platform (20) services (step 414). For example, the venue (202) may have tags (16*a*) installed but it is no longer using the tags (16*a*), or it is not using the tags for a particular event. If not, the event user device (14*a*) is redirected to a global default target (step 416) that may inform the event user that the services are no longer available, are temporarily out of service, or the like. If the venue (202) is actively implementing platform (20) services, the method (400) may make another determination. At step (418), the method (400) may determine if a particular event is currently (or soon to be) in progress, or recently ended. In an embodiment, an event may be determined to be in progress based on the time that the event is scheduled to begin. Since many venues (202) open before the actual event begins, and close after the actual event ends, the window set for an event to be in progress may encompass a given amount of time before and after the actual activity begins/ends. In an embodiment, the time that the "event in progress" determination is made (step 418) may be recorded to serve as a timestamp to approximate the time that the event user device (14*a*) scanned the tag (16*a*). In other words, the unique ID, tag ID, and time determination may be recorded for later use, in certain embodiments. If the event is not in progress, the event user device (14*a*) may be redirected to a venue default target (step 420) such as a Web page for the venue, or another Web page such as a page to identify that an incident has occurred at the venue (202) at the location/point of interest in which the tag (16a) was scanned. Incidents may encompass any sort of incident such as a need for something to be cleaned up to calling emergency services.

If the event is in progress, the method (400) may also determine if the tag ID belongs to a grouping of tag IDs (step 422). Tags (16a, 16b) may be grouped for many reasons and in many different ways. Tags (16a, 16b) may also belong to more than one group. As one non-limiting example, in the stadium of FIG. 2, the tags (16a) may be grouped by seating type or section (e.g., FIG. 2, 222, 224, or 226), e.g., VIP seats may belong to one group, loge seats to another group, and discount/student seats may belong to yet another group. If data associated with the tag ID indicates that the tag belongs to a group, the event user device (14a) may be redirected to a target for the particular group. For instance, the target for users sitting in VIP or loge seats may be a Web page associated with event that includes premium content, offers, and the like, whereas the target for users sitting in discount/student seats may be a Web page having content and features that typically appeal to students, recent graduates, or the like. Thus, the method (400) obtains the information it needs to enable redirection to the appropriate group target (step 426). If data associated with the tag ID indicates that the tag does not belong to a specific group, the event user device (14a) may be redirected to an event default target such as a standard Web page for the event. Thus, the method (400) obtains the information it needs to enable the redirection (step 424) to the default target for the event. In an embodiment, the information needed for redirection may include a URL for the target with parameters, values, patterns, or the like appended thereto such as a target ID to identify the target and the tag ID.

Method (400) may simultaneously process other data such as looking up one or more records associated with the unique ID (step 428). In embodiments, the platform (20) may gather information relating to user activities via the user device and unique ID. For example, the platform (20) may gather data relating to tags that the user has scanned in the past (across a variety of different events, venues, or the like) and activities associated with those tag scans (e.g., purchases made, content looked at, coupons downloaded), although embodiments are not limited thereto. This data may be stored in association with the unique ID assigned to the event user device (14a). Thereafter, a controller may associate the unique ID, its record, its record location or the like with the tag ID, target ID, a URL, any other determined information, or combinations thereof (step 430). The event user device (14a) may then be redirected to the appropriate target that has been determined for the event user device (14a).

When a request comes from a remote user device (14b), the method (400) starts out essentially the same as with the event user device (14a). That is, the redirect/identification server (302) receives the request (step 402), checks for a manifest containing a unique ID (step 404), assigns a manifest with a unique ID if one has not yet been assigned (step 406), and sends it to the remote user device (14b, step 408) for secure storage thereon. If the remote user device (14b) has a manifest, then the redirect/identification server (302) obtains it (and other information such as a unique ID) from the remote user device (14b). Either way, the redirect/identification server (302) has the information that it needs such as unique ID, URL, tag ID, and the like, and forwards the information to the interface server (306) to continue the method (400). The interface server (306) may then look up, or cause to look up, the record associated with the unique ID (step 428) assigned to the remote user device (14b). At the same time, the interface server (306) may cause a determination to be as to whether the venue exists (step 414). In this case the interface server (306), or other server, may look at the data associated with the tag ID to determine from where the tag (16b) that was scanned originated. For example, the MRC (17b) may have originated from a particular signal, transmission, etc., (e.g., network, regional network, etc.), Web site (e.g., for the venue, a streaming service, etc.) or the like. If, the method (400) determines that the venue does not exist, for example, if the tag is to an unrelated element, then the remote user device (14b) is redirected to that unrelated element or to a global default target (step 416), for example if the tag is related. Assuming that the venue in this case does exist, the interface server (306)/method (400), then determines whether the event is in progress (step 418). If the signal, transmission, Web page, or the like is transmitting an event as it is occurring in real time then the event is in progress. Such can also be determined by a time stamp or time record set within the system. Either way, in an embodiment, the time the determination is made may be recorded by the platform (20). If the event is not occurring in real time (e.g., the user is watching a recording after the fact), then the remote user device (14b) will be redirected to an appropriate target such as a Web page relating to the event (step 420). However, the proprietor can set any time parameter to define "real time". For example, a proprietor may desire to allow recordings watched within N number of days of a live event to constitute real time. The interface server (306) may then determine if the tag (16b), via the tag ID belongs to a group (step 422). For instance, different tags (16b) may be associated with different signals, transmissions, Web sites, or the like. Some of these tags (16b) may form groups based on predetermined criteria. Thus, if the tag (16b) belongs to a group, the remote user device (14a) will be redirected to the target for the appropriate group, and if not, the remote user device (14a) will be redirected to the default target. The default target for remote users may or may not be the same default for event users. Either way, the information relating to the determined redirection target is obtained (steps 424, 426). At step (430), a controller may associate the unique ID, the record for the unique ID, a pointer to the record for the unique ID, the tag ID, and target information such as a URL, target ID, or both. Thereafter, the remote user device (14b) is redirected to the appropriate target (step 432), as was described with respect to the event user. In certain embodiments, the step of (428) may be provided in parallel to or concurrent with the lookup of the tag ID (step 412), where the unique ID is necessary for determining any of the other elements. Furthermore, the unique ID may be stored, for example in local memory or cache, which is readily accessible or known to the system after step (410).

In an embodiment, the user device (14a, 14b) may receive a redirect URL from the redirect/identification server (302) at the end of method (400) to redirect the user device (14a, 14b) to the appropriate target. For instance, the method (400) may return a target ID to identify the particular target. The target ID, tag ID, unique ID (and/or information associated therewith), or combinations thereof may be appended to the redirect URL for the target, which is sent to the requesting user device (14a, 14b). The requesting user device (14a, 14b) then uses the redirect URL to send a new request, this time for the target, which is received by the redirect/identification server (302) and is forwarded to the interface server (306) for processing. Alternatively, the target ID, tag ID, and unique ID may be used by the platform (20) without sending a redirect URL to the requesting device at the end of method (400). Regardless of the forgoing, the requesting user device (14a and/or 14b) receives the target of the redirection whatever that target may be. For example, a target may be a static Web page, a dynamic Web page, an application delivered by way of one or more Web pages, files, data, information, or combinations thereof. As one non-limiting example, the fan portal (218) may have been the target identified by the target ID, and it may include application code "wrapped" or embedded in in an HTML document. Application code includes, but is not limited to, Web application code, progressive Web application code, cloud-based application code, native application code, native mobile application code, other such code, or combinations thereof. The HTML document (and cascading style sheet, etc.) generally determines the format/layout of what the user sees as is known in the art.

Furthermore, targets are not necessarily static. In fact, the same tag (e.g., 16a) may cause a user device (e.g., 14a) to be redirected to distinct targets depending upon when the particular tag (16a) is scanned. For example, a venue (202) hosts many events over the course of a season, year, decade, etc. Each event may have its own target as the individual events are distinct. For example, the fan portal (218) may be the target of a game in progress, such as the football game shown in FIG. 2. The game in progress is between team A and team B. The next game (or other event) hosted at the venue (202) may be a soccer game; thus, the fan portal (218) for the soccer game is different from the fan portal (218) for the football game. In other words, the two fan portals (218) are distinct targets for redirection. The target that is reached by scanning the tag (16a) is coordinated with targets, such as via a distinct target ID, so that the user device (14a) is redirected to the football fan portal (218) during the football game and the same user device (14a) can be redirected to the soccer fan portal (218) during the soccer game even though the exact same tag (16a) is scanned by the exact same user device (14a). Of course, this is one non-limiting example. A single tag (16a) may be used by a proprietor to redirect a user device (14a, 14b) to any desired target. Thus, the target to which the user device (14a) is redirected may be changed from game-to-game.

A proprietor may also change a target during the course of a particular event. For example, referring again to the fan portal (218) shown in FIG. 2, the user may use the fan portal (218) to partake in activities such as buying food or merchandise, placing a wager, view replays (220), the delivery of a target based on a trigger, etc.

One unique aspect is related to dynamic content. At any time during the event, the jumbo screen (204) may display a hidden "unique offer" (214) that is only available to the first 1,000 users who respond to the "unique offer" (214) after it is displayed on the jumbo screen (204) by scanning a tag (16a) or the like. A countdown (216) on the jumbo screen (204) shows the number of event user devices (14a) that have claimed the "unique offer" (214). When the threshold number (1,000) is reached, the unique offer may be revealed and is no longer available to any other users. This countdown and the limited nature then become a type of dynamic content. One way an event user may respond to the hidden "unique offer" (214) is by scanning or rescanning the tag (16a) while the unique offer (214) is available. In this case, the user device (14a) may be redirected to a Web page or the like, for the unique offer (214), e.g., to input information, make payment, or the like, per a process that is the same as/similar to the method (400). The redirect target of this scan, however, is the "unique offer" (214) and not the fan portal (218). Another way a user may be able to respond to the "unique offer" (214) is by a pop-up window (e.g., in/over the fan portal [218]) or the like, which may be pushed via the socket server (324) in a non-limiting embodiment. Thus, the term "target" should be broadly construed although it may be described herein with respect to obtaining a fan portal (218) or other specific examples. One of ordinary skill in the art would understand a target of redirection as described herein may be a multitude of different targets with various purposes, designs, capabilities, and the like. Therefore, the target to which a particular tag (16a, 16b) is assigned, may be changed by simply changing the target identifier ("target ID") associated therewith.

There may be instances where the content delivered via the target may need to be changed, updated, altered, released, opened, or other such stipulations based on a rule and/or other conditions. Rules may be defined to force a modification of content already delivered, deliver additional content, information, data, release content, and/or make other such changes as would be appreciated by one skilled in the art. In this non-limiting example, the target delivered at (432) FIG. 4 includes a Web application, such as a progressive Web application (PWA), that has a pull function, which may be rule-based. The pull function, as one non-limiting example, may be time based, requesting information to be pulled from the platform (20) via the interface server (306) every 10 seconds, minutes, N seconds, N minutes or the like. As another non-limiting example, the pull function has the ability to have data updated on a rolling basis. In the sporting world, this is common when updates are provided to the score of a game, the time left in a game, or both as non-limiting examples. The platform (20), however, may push rolling data to a user device (14a, 14b) instead of having it pulled from the platform. Pushed data may be sent to user devices (e.g., 14a, 14b) without being requested. Data may be pushed to a user device (14a, 14b) for any number of reasons, a few of which are detailed herein. Thus, information, data, etc., may be pushed to a user device (14a, 14b), pulled for a user device (14a, 14b,) or both. In many instances, a Web application or the like may be based on a template having dynamic elements embedded therein. The contents of such dynamic elements may be altered via push techniques, pull techniques, or both. Content, data, information, and the like, may be pushed and/or pulled via a socket connect utilizing a socket server (324) or any other socket connection, communication connection, protocol, or combinations thereof as is available to the platform (20) under a set of given circumstances.

Figure 5:
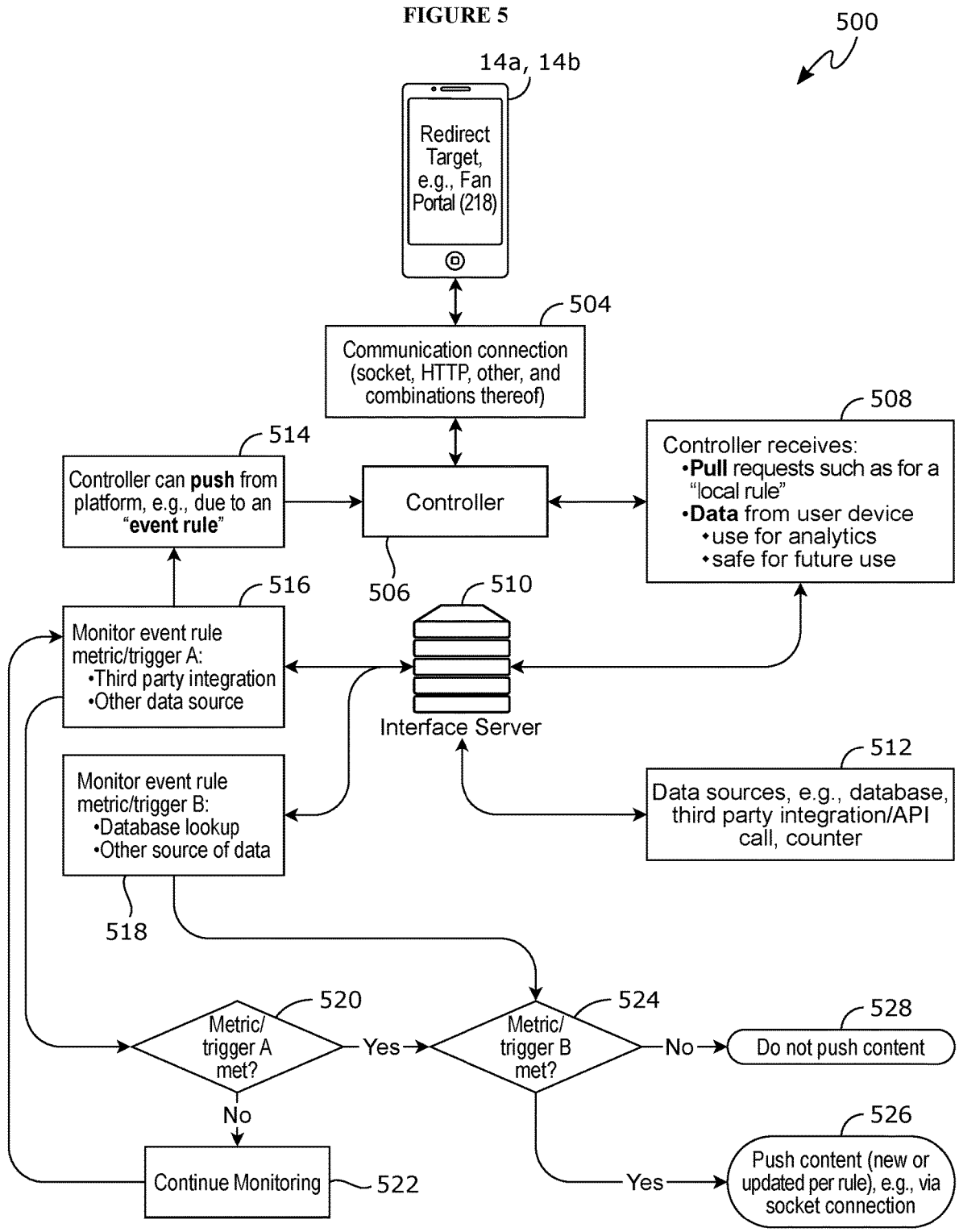
FIG. 5 depicts an embodiment of a system wherein the system is enabled to push or pull data or information or due to triggering events or rules to modify or augment a target delivered to a user device.

The method detailed in FIG. 5 may be invoked while the target of redirection (e.g., fan portal [218]) is loading on the requesting user device (e.g., 14a and/or 14b), after the target is already loaded on the requesting user device (14a and/or 14b), or both. As with all methods detailed herein, steps in the method (500) may be used in whole or in part, in the order shown or a different order, be executed on one device or more than one device, be used in combination with some/all of the other methods described herein or as is known in the art, or combinations thereof.

Using fan portal (218) as a non-limiting example while referring to FIG. 5, oftentimes it may be desired to alter information, regardless of type (e.g., video, images, instructions, etc.,) while the user is using the fan portal (218). Information may be altered using push, pull, and other techniques, taking advantage of the communication connection (504). The communication connection (504), which may be a socket connection or any other appropriate type of connection, allows communications between the user device (14a and/or 14b) and the platform (20) via the one or more networks (18). A controller (at 506) may be a set of software code for managing, directing, or generally being in charge of one or more rules, enabling pushing and/or pulling of information per the rules. In this example, rules may be used to change content on the user device (14a and/or 14b). The interface server at (510) may be the same interface server shown in FIG. 3 (306), just at the data sources at (512) may be the same data sources shown in FIG. 3 such as database (308), administrator server (310), analytics server (312), blockchain (314), geofence (316), time (318), third party integrations (320), and proprietor portal (322), without limitation. Moreover, interface server at (510) may facilitate utilization of the forgoing, in the same manner or similar manner as described with respect to FIG. 3. Thus, in a sense, user device (14a or 14b), communication connection (504), interface server (510), and data sources (512) are shown in FIG. 5 just to help the reader visualize interactions detailed in FIG. 5.

Examples of rules that are detailed with respect to FIG. 5 include event rules and local rules, although embodiments are not so limited. Generally, an event rule is monitored by the platform (20) and if satisfied causes data to be pushed to one or more user devices (14a, 14b) and a local rule, when invoked, causes a user device (14a, 14b) to request data (i.e., pulls data) from the platform (20). An illustrative example of an event rule is if team "A" scores a touchdown, push a digital offer to all user devices (14a, 14b) that have scanned tags (16a, 16b). Here, the metric or trigger of the rule can be monitored (step 516) such as by directly sending a request or query to a data source (at 512) via the interface server (at 510), receiving data from the data source (at 512) on a regular basis such as every 5 seconds, 5 minutes, or the like (via the interface sever [at 510]), or combinations of both. The platform (20) may to monitor for the metric/trigger e.g., a touchdown (step 520) and continue to do so (step 522) until a metric/trigger e.g., a touchdown has occurred (step 520, yes). If the rule has been satisfied, the platform (20), can push the digital offer to all of the qualifying user devices (i.e., that have scanned a tag [16a, 16b]).

A more complex event rule may include more than one trigger/metric. For example, the rule may be that if team "A" scores a touchdown, push a digital offer for a free beer to all event users over the age of 21 that have used their user device (14a) to scan a tag (16a) in the venue (202). The first metric/trigger of whether a touchdown has been scored may be monitored as described above. The second metric/trigger may be monitored (at 518, 524) in the same or similar manner if the metric/trigger warrants, or it may be determined before or after the first trigger/metric has been satisfied. For example, since in this example the second metric/trigger relates to age, a query may be sent to one or more data sources (at 512) to find all users who are over the age of 21. Records stored on database (308), for example, may be consulted to look for age data in connection with unique ID data to determine if the person who has loaded the fan portal (218) on his/her device (14a) is of legal drinking age. As an alternative source of data or for any other reason, the interface server (at 510) may cause another data source (at 512) to be consulted to determine user age. For example, one or more third party integrations (320) may have age information; thus, an API call or other query may be made to the third party integrations (320) to obtain age data. As with the first example, if the first metric/trigger (step 520, no) is not met (i.e., touchdown), then the platform (20) continues to monitor the metric/trigger (step 522). If the metric/trigger (step 520, yes) has been met the platform (20) determines if the second metric/trigger (518) has also been met (step 524).

Where the second trigger/metric has not been met (step 524, no) then the target on the user device (14a) is not updated (step 528), such as with the digital offer. Depending upon the rule, the second metric/trigger may continue to be monitored or not. For example, if the digital offer was to be sent only one time, then the rule is satisfied, and no additional monitoring is needed. If, however, the rule is to send the same digital offer (e.g., for a beer) every time team "A" scores a touchdown, the second metric/trigger would not have to be redetermined since even if the user turned 21 that day, the user's age would not change. Of course, if the event went past midnight, the rule could be structured to recheck ages after midnight. This does not mean that for a given rule a second (or third, or fourth, etc.,) trigger/metric would never need to be monitored. Should an additional metric/trigger be defined by a rule that needs additional monitoring, the method (500) will be allowed to do so. Going back to step (524), if the determination is yes, the digital offer may be pushed (526), such as via the controller (at 514, 506) to those users who have scanned a tag (16a) and who are at least 21 years old. Pushed content may update an element, such as a dynamic element, on a Web page, cause a popup to show on the user device (14a, 14b), send content to a digital wallet (24a, 24b), or any other way to push content as is known in the art.

Local rules, as an example, may be associated with one or more targets being utilized for a given event. Referring again to FIG. 2 as one example, each section of seats (222, 224, 226) may represent a grouping of tags (16a) such as student/discount seats, loge seats and all other seats. As such, when a tag (16a) is scanned by a user in section (222) the device (14a) may be redirected to first template of fan portal (218), when a tag (16a) is scanned by a user in section (224), the user device (14a) may be redirected to a second template of a fan portal (218), and when a tag (16a) in section (226) is scanned the user device (14a) it may be redirected to a third template for a fan portal (218). Thus, all users may be redirected to a fan portal (218), but each fan portal (218) may be based on a different template. In this way, a proprietor may deliver customized content to users in different sections based on the template to which the user device (14a) was redirected. Local rules, other elements, or both may be written into each template to further customize content, which in some instances may be on an individualized level. That is elements of application code may be rules built into the system to provide the content delivery determined by the system, or can be applied at an earlier stage, e.g., at a tag ID group target information (step 422), which can provide a different original redirect URL/target than is received by or directed to, for another tag ID in a different group.

Referring back to FIG. 5, the interface server (306, at 510) may determine, or cause to be determined, if there are any rules associated with a given template (e.g. for fan portal [218]) or another target. This is especially true where the rule may be designed as an event-type rule where content may be pushed to a device (14a). In this case, however, the rule may only be provided in a given template (e.g., for users sitting in loge seats). A given template, however, may also have local rules written therein. For example, a rule associated with a fan portal (218) template to be distributed to loge seats, may be if the user has season tickets, then include a digital offer for discounted season tickets for the following year. Thus, per this illustration the local rule may desire to pull/acquire (at 508) season ticket information before, during, or after the template for the loge seats is loaded on the event user device (14a). To obtain this data, the database may be queried (at 512), via the interface server (at 510), using the unique ID to check data records for the requested information (e.g., purchased season tickets). As with the push example, if the database (at 512) does not store such information, the information is inconclusive, the local rule requires confirmation from an outside source, or other such situations, other data sources (at 512) may be consulted via the interface server (at 510). If the local rule is satisfied, then a digital offer for discount tickets (next season) is sent to the template. If the local rule is not satisfied, then the template uses a "default" digital offer/content such as an ad for non-discounted season tickets, upgraded tickets for the next event to be held at the venue (202) or another, similar example. In an embodiment, data associated with the unique ID may be pre-analyzed to see if the local rule has been satisfied. Alternatively, data associated with the unique ID may be gathered (e.g., from a database, a third-party integration such as a ticketing service, or the like) and analyzed when the event user device (14a) makes the request. As yet another option, the data may be pre-analyzed and verified/ checked for changes upon the event user device (14a) request. The interface sever (306) may take all of the variables from the target application code, template, rules, and the like and send requests/queries to the appropriate data sources or links to the data sources (at 512). The data sources may include data from the database (308), blockchain (314), geofence (316), timestamp (318), third party integrations (320) such as data servers/databases, analytics server (312), and administration server (310), and a counter (at 512), without limitation.

In some implementations, a counter may be needed. For example, a counter may be enabled to maintain the countdown shown in FIG. 2 (216). A counter may be software on platform (20) that may be used as a counting mechanism for rules or other reasons. As such, the counting mechanism may be configured to meet the counting requirements of a rule or other counting need. As an illustration, a counter may count the number of tags (16a) scanned in a venue (202) during a particular event; count the number of tags (16a, 16b) scanned by a particular user device (14a, 14b) in a predetermined time window; count the tags (16a) scanned by a particular user during a particular event; count the number of times a user has interacted with the target delivered to that user device; or other such non-limiting illustrations.

Thus, while a target is displayed on a particular device (14a, 14b), dynamic content may be seamlessly and dynamically updated/changed per coding/interactions between the user device (14a, 14b) and the platform (20). Certain dynamic changes occur through push and pull techniques such as those detailed by FIG. 5. However, dynamic updates/ changes may further take place through the use of various third-party application programming interfaces (APIs) and their respective functionality. At a high level, the interface server (306) may connect, or may cause the third party integration server (320) to connect, to third-party hardware/ software (e.g., server) via one or more third-party APIs/API calls to access the respective third-party integration/functionality as is known or will be known in the art. Thus, third-party integrations/functionality may push or pull information through analytics server (312), retrieve it from database (308) or another data store, or combinations thereof, for real time/live streaming, updating, changing, and the like as is called for by rules/instructions associated with the target of the tag ID. Furthermore, embodiments allow for the use of interactive, two-way communications between user devices (14a, 14b) and the platform (20) such as via the socket server (324) and/or a socket API, or the like as is known in the art. Certain communications then end, upon the end of the event or where the user closes the application, where the communication (at 504) is severed.

As is also indicated in FIG. 5 at (508), the platform (20) may collect a large amount of data via user devices (14a, 14b). For example, after scanning a tag (16a, 16b) the platform (20) may receive data from the user device (14a, 14b) such as date, time, and GPS or other location, the device orientation (i.e., landscape, portrait), type (e.g., iPhone, Android), IP and other addresses, and operating system as a few examples. Thus, methods such as methods (400, 500, or both) may be configured to collect and aggregate data. Additionally, tools such as cookies, widgets, plug-ins, and similar tools may also be used to obtain data from user devices (14a, 14b). This, and other, information may be stored in a data source (at 512) such as database (308) or other data storage and in association with the unique ID. Data acquired using the aforementioned tools and other tools/techniques may relate to user engagement with a target such as a fan portal (218) as one non-limiting example. Such data may relate to digital offers presented to the user, digital offers downloaded by the user, products viewed by the user, purchases made by the user, to name a few examples. Such tools/techniques may also gather data relating to other user engagements such as total screen time, Internet browsing (times, sites/pages accessed, software used), updates to Web pages, other Web sites visited, the Internet, and the like. The user may also directly provide information via the user device (14a, 14b) such as by inputting personally identifiable information to obtain opportunities or offers such as unique information relating to user interests, user responses to questions, generic information about age or sex, or any other type of personally identifiable information. Such data is of high value to, for example, advertisers, proprietors, and the like, as it provides a large insight into consumer purchasing and Web browsing habits.

Data related to user devices (14a, 14b) may also be obtained from third party sources. As one example, when a query, request, or the like sent to a third party, the platform (20) may provide certain information with that query, request, etc., such as the unique ID, tag ID/target information, or combinations thereof. Thus, data returned by the third parties may also be stored (e.g., temporarily, or persistently) in association with unique IDs, tag IDs, target information, or combinations thereof. As one non-limiting example, service providers such as mobile/cellular providers may be queried to obtain information about user devices (14a, 14b). The unique ID identifying a particular user device may be sent to the service provider to obtain information about the particular device, or the service provider may provide information that may be later associated with a particular device. Either way, the platform (20) may collect and store information about users via the unique ID assigned to each user device (14a, 14b). As another non-limiting example, information associated with unique IDs assigned to user devices (14a, 14b) may be collected from various third party integrations (320) such as in-venue/event metrics, integrated third-party metrics, ticket brokerage, and other tools, without limitation to the forgoing. In-venue/ event metrics may include data collected relating to the venue, event, or both. For example, information relating to user purchases at the venue and/or during an event such as tickets, food, merchandise, and upgrades and the like may all be gathered and stored in association with the unique ID. Similarly, ticket brokerage integrations (e.g., 320) may be used to gather information from ticket brokers who sell tickets for the venue (202), event, or both, and may include a wide range of marketing data, not only about ticket purchases made, but also related information about the user. Thus, third-parties, including third party metrics integrations (320) may enable collecting information about users, user devices (14a, 14b), or both from third-parties including those who participate in a shared program or who sell or otherwise provide marketing information, demographics, and other data about the user.

In addition to collecting and storing data associated with unique ID, the platform (20) may analyze such data, which may or may not be recorded in association with unique IDs. Data analysis may occur while it is being collected, after it is collected and before it is stored, after storage, or combinations of the forgoing. Data, raw, analyzed, or both, may be stored in database (308) or another data store (at 512) such as blockchain (314), without limitation. The analytics server (312) may communicate with various aspects of the platform (20), to ensure data received from various sources is appropriately captured for decision making, analytics, and the like. That is, analytics server (312) may communicate with (either directly or via the interface server [306]), user devices (14a, 14b), third parties, third party integrations (320), time/timestamp (318), geofence (316), blockchain (314), database (308), even proprietor portal (322), or combinations thereof, so that data is captured as needed for desired analytics, decision making, and the like. For example, data may be subject to artificial intelligence analysis include machine learning/pattern recognition/deep learning as is now known or will be known in the art. Collected and/or analyzed data may be coupled with other information relating to the user/user device (14a, 14b), such as the unique ID associated with the user device (14a, 14b) for a variety of reasons, including content selection as one non-limiting example.

Content for display on user devices (14a, 14b) may be customized in numerous ways as has been detailed with respect to methods (400 and/or 500). Content may also be customized where data/data analysis shows that a user has, or group of users have particular preferences. These preferences may be utilized to modify content, such as advertisements that are delivered to that user/group of users. Furthermore, data analysis may allow the proprietor to generate rules specific to a user/group of users, send custom e-mails, push socket notifications or other messaging based upon the user's interactions/group of users' interactions with the platform (20), other such similar examples, or combinations thereof. Indeed, this provides for multiple opportunities for interaction and communication between the proprietor and the user to continue building relationships that can then be mined for longer-term relationships. As yet another implementation, the platform (20) may utilize unique IDs together with known information associated therewith to deliver unique advertising to users via third-party advertising services. For example, where available, the platform (20) has the ability to interface with advertising platforms to deliver a customized experience based on the user's search history or user information as a whole. Taking the forgoing together, it should be apparent that content provided to a particular user or group of users may be customized or modified as was described above with respect to FIGS. 4 and/or 5 and that data/information gathered as the user is engaged with the event target or the like, may be used to update/modify target content in real time, upon a subsequent scan of tag (16a, 16b) by the user device (14a, 14b), or both (e.g., at 508). For example, the socket connection (at 504) may be used to deliver pulled content, push content, notifications, and the like, and/or dynamically update content while the event is in progress. Indeed, such socket connection may be particularly useful where a plurality of users are online at one moment and the total creates an occurrence of a trigger which provides some dynamic content to be released, for example, through a push of that target to the then active user devices that have met the limitation to receive that target.

Analytics may also determine which feature, elements, or the like provided by a target such as the fan portal (218) a user or group of users interact with the most or spend the most time viewing. Thus, advertising on high-usage pages, features, elements, etc. may come at a higher cost. In other words, proprietors may charge a premium to advertisers wishing to purchase the ability to place content, such as advertisements or digital offers on the pages or features of the fan portal (218) or other target that receive the most traffic.

The forgoing has been described largely with reference to a sports environment where event users can scan tags (16a) located proximate each seat (208)/other point of interest or remote users can scan MRCs (17b) that appear on a screen such as a television or computer display. Other environments may utilize the same sort of tag (16a) placement strategy, such as an artistic performance where tags (16a) may be placed proximate a seat. However, many artistic performances are not televised or otherwise visually distributed while the performance is taking place. Thus, these proprietors may enable an option for patrons at a specific donation level, or season ticket holders to remotely access the performance as the performance is taking place such as via an account on a Web site where the user can scan an MRC (17b). Alternatively, certain remote users may receive a digital communication such as an e-mail or physical communication such as a card or badge that is similar to a credit card having information encoded thereon so that the remote user can scan the MRC (17b) on the badge to access the target that is associated with the scanned MRC (17b). In this way, remote users that are unable to attend a particular live performance may still be able to enjoy the performance or features thereof via platform (20). And since the target for remote users may have distinctive features enabled (e.g., replays, filters) during a performance that are not available to an event user (so as to not distract the performers) the remote user may be able to watch the entire performance on the remote user device (14b) and access other target features during the live performance.

Concerts and concert/festivals (collectively "concerts") may utilize the tags (16a) already in place at the venue (202) in which the concert is being held if the proprietor so allows; alternatively, concert proprietors may utilize a system that is not attached to the venue (202), or they may use both. As an example, concert proprietors may include tags (16a) separate from or integral with concert tickets, passes, credentials, or the like so users can scan (or click on if digital) the MRC (17a) to access the desired target. In an embodiment, the ticket, pass, credentials, or the like may be a badge or badge-like so that it can be attached to a lanyard, put in a wallet, etc. Lanyards may be distributed with the ticket, pass, credentials, etc., or they may be purchased. As an incentive to purchase a lanyard, the lanyard may be associated with its own tag (16a) and associated target (e.g., a digital offer). In an embodiment, remote users who are unable to actually attend the concert may still be able to enjoy certain aspects of the concert via the tag (16b) associated with a ticket, pass, credentials, etc. In an embodiment, remote users may opt to purchase just a tag (16b) so that they may enjoy certain aspects of the concert without being there. As one non-limiting example, the tag (16b) may enable the remote user to access live or recorded video of the concert, which would not otherwise be available without concert attendance.

In the case of schools and the like, tags (16b) may be linked to particular students and distributed to students and parents alike. For example, the student's tag (16b)/MRC (17b) may be on the student's school-issued ID or student-related identifier, and the parent's tag (16b)/MRC (17b), which may be the same as or different from the student's MRC (17b), may be distributed to parents on a magnet, badge, card, or the like so that the student/parent can simply scan their respective tag/MRC (17b) (with respective user device [14b]) to access a target (e.g., a Web page) with information relating to the particular student such as grades, classes, upcoming activities, as a few non-limiting examples. In fact, with respect to graduation, concerts, sports events and the like, a secondary target may be accessed via a link in the "primary" target, although embodiments are not so limited. That is, parents, teachers (with their own tag/MRC (16b/17b) to connect to the desired target), other employees and the like may access targets (e.g., a Web page or the like) for events relating to the school in more than one way. One way may be via the tag/MRC (16b/17b) that may be used on a regular basis as described above, or via tags (16b) permanently or temporarily placed at the school gym, auditorium, or the like, which will enable access to the event-specific target/target content.

Historic sites, museums, zoos, and the like may use any of the forgoing strategies and other unique strategies to enhance visitor experiences via one or more targets of a tag (16a, 16b). As one non-limiting example, tags (16a) may be located at or near entrances for users to scan with their devices (14a) to obtain the target. Additional tags (16a) may be located at, near, within, etc., various exhibits to provide supplementary content. In this way, the target of the tag (16a) may be streamlined and supplemented at-will. In an embodiment, users may buy merchandise/concessions via in-venue tags (16a) much like the stadium example. By making a purchase, the user may use a tag (16a) associated with the purchase to connect to yet another target for that particular tag (16a) such as a coupon, discounted entry tickets, and free entry tickets as a few non-limiting examples. In fact, with any of the forgoing examples tags (16a, 16b) may be placed on or with merchandise of all sorts to be able to access targets such as coupons and/or other incentives.

The system (10) therefore can be implemented in entertainment venues, as well as other areas where user engagement is desired and/or required, such as college dorm rooms, hotel rooms, cruise ships, trains, aircraft, rideshare vehicles and the like. While some examples of the uses of this system are discussed herein, the scope of the present invention should not be limited to the specific examples provided, and the term "venue" should be construed to include alternative or equivalent embodiments which could be devised by one skilled in the art.

As discussed in greater detail below, a differentiator of the system is that it uses data input from several variables in order to provide real-time content to the end user, specifically at a trigger of some predefined requirement or rule. These data sets can be from a multitude of sources such as ticket brokers, which can provide details on a user who purchased tickets to an event, or to advertising database data, which can provide past content interactions from various sources on and off the Internet for a particular user. These analytical datasets can also be used to provide in-venue content or offers to users inside of an event on an individual basis, on a group basis, or to the venue as a whole venue based upon the collected data/feedback gleaned from users inside of the venue (i.e., if the analytics portal data reveals that 75% of users select hamburgers as their favorite type of food, the in-venue multimedia displays would be triggered to display content relevant to the selling of hamburgers). The system can also implement machine learning algorithms which, when coupled with a combination of some or all of the data provided from the analytics (312) and database (308), can provide real-time content that is predicted to be favorable to the end user. The fan portal can be in various forms from browser-based Web pages, cloud-based Web apps, progressive Web apps, downloadable apps, etc. The system could provide multiple options to the fan portal such as ordering food, purchasing merchandise to be delivered to a seat location, viewing replay footage, and/or placing wagers inside of the stadium. The system would provide the ability to offer all tags on the system the same interactive content options, or to offer different content to users based on predetermined data sets or based on variables and data within the system.

Because of the known location of the tag, whether static or movable, the precise location, or GPS location can be utilized as part of the data to generate content to the user device. Similarly, an API related to a vehicle can identify a starting location and an ending location of the vehicle trip, to the extent that one is available. Accordingly, the API can provide data to the system that identifies the planned route of the vehicle and content relevant to that particular location may be provided to the user along that route, which may be attractive to the user. Data from the views, page views, time spent on a page, advertisements viewed, or digital offers downloaded by the user can provide further data regarding the habits or interests of the user and can be further utilized by the system to generate unique and individualized content to the user.

A unique feature of one embodiment of the methods and systems detailed herein is the generation of unique content upon the aggregation of a total number of users within a particular system, in which the group as a whole is responsible for meeting a threshold to access content, digital offers, or combinations thereof.

Figure 6:
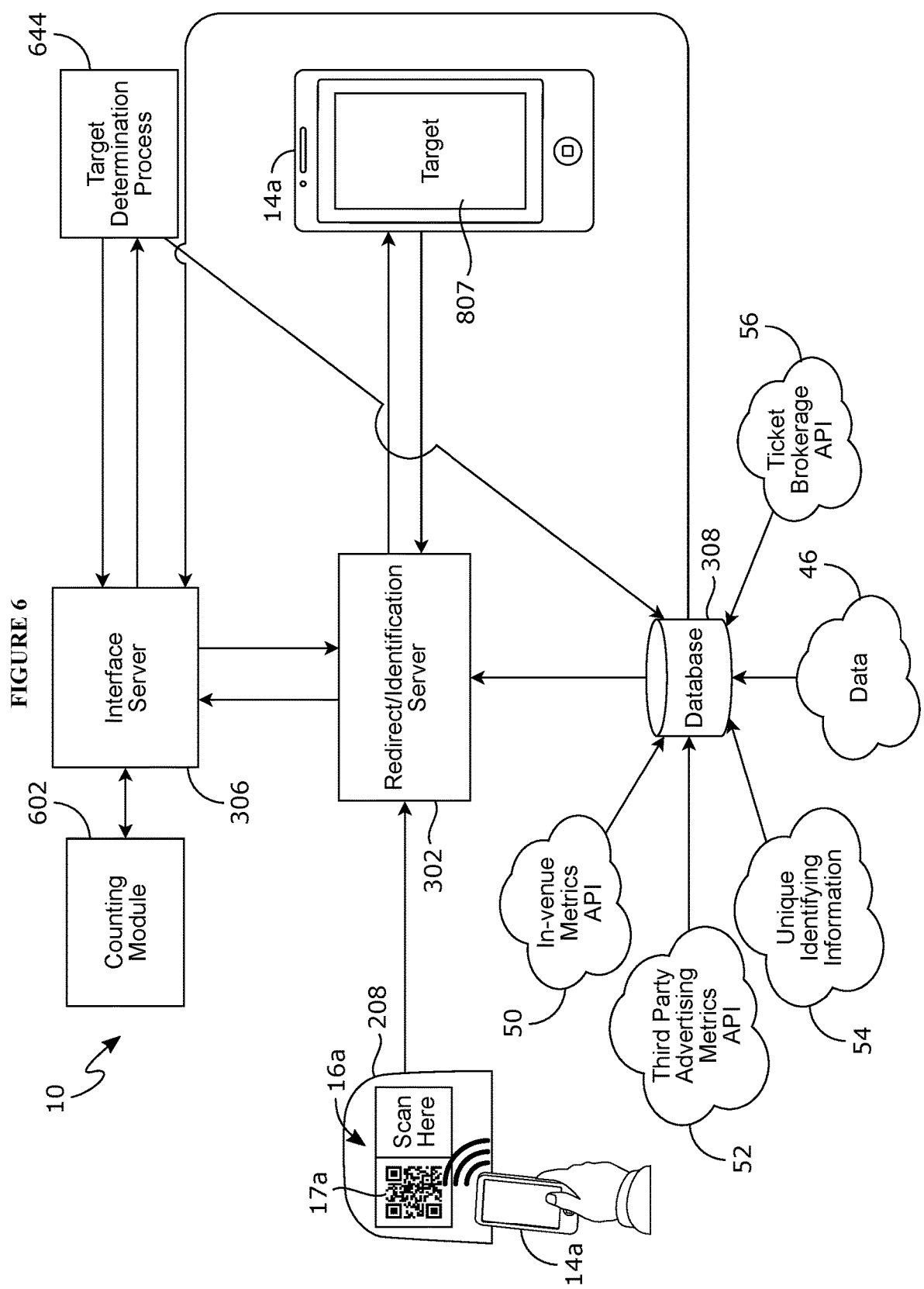
FIG. 6 is a diagram of one embodiment of a system that enables delivery of the customized content.

For example, Home Team has announced that they are providing a unique digital offer to all fans in the stadium if x number of fans are all on the system at a given moment. Home Team has a total of 10,000 fans in attendance and the unique digital offer is being triggered upon meeting a threshold of 1,000 fans all being on the system at a given moment. Upon meeting the threshold, a unique digital offer is provided. This would be operable, as detailed in FIG. 6.

A first user, and a plurality of users would use a user device (14a) to scan a tag (16a) having a MRC (17a) therein, for example on a seatback (210). Scanning by the user device (14a) engages the redirect/identification server (302), and to the interface server (306). Here, the target determination process (644) includes a rule that is defined by requiring a counting of a total of 1,000 user devices being active on the system at a given moment. Accordingly, a counting module (602), must receive and manage the number of user devices active on the system at a given moment from the interface server (306). The threshold being the 1,000 active users, provides that the database is storing a particular target, which is the release of a special coupon for a free hotdog to all active users. The counting module receives and tracks the number of active users as it increases or decreases. For example, the counting module may also populate or display the total number of users, either on the user device (14*a*) within the fan portal, on the jumbo screen, or on a video display. Upon meeting of the 1,000 active user threshold, the target determination process receives confirmation from the interface server to retrieve the target, being the free hotdog, and then pushes that information form the database to the interface server (306), through the redirect/identification server (302) to the user device (14*a*).

The venue can then set this particular rule, wherein additional users, who later access the system may also receive the offer, or only users within x number of minutes receive the offer, or any other rule as determined by the proprietor. The free hotdog thus is provided through a redirect to a new page on the user device or is pushed to the user, through a Web app or through a socket, as non-limiting options. The user can then use the free hotdog offer. As the system is enabled, the system would know the seat of each user awarded with the 1,000 hotdogs and could automatically deliver those hotdogs to the seats of those users, as it would have the tag ID corresponding to each seat. Otherwise, the user could request the hotdog be delivered, and have it brought to the user's seat by accessing this option through the fan portal, or the user could walk to a concession stand to redeem the free hotdog using the digital offer delivered to the user device.

Figure 7:
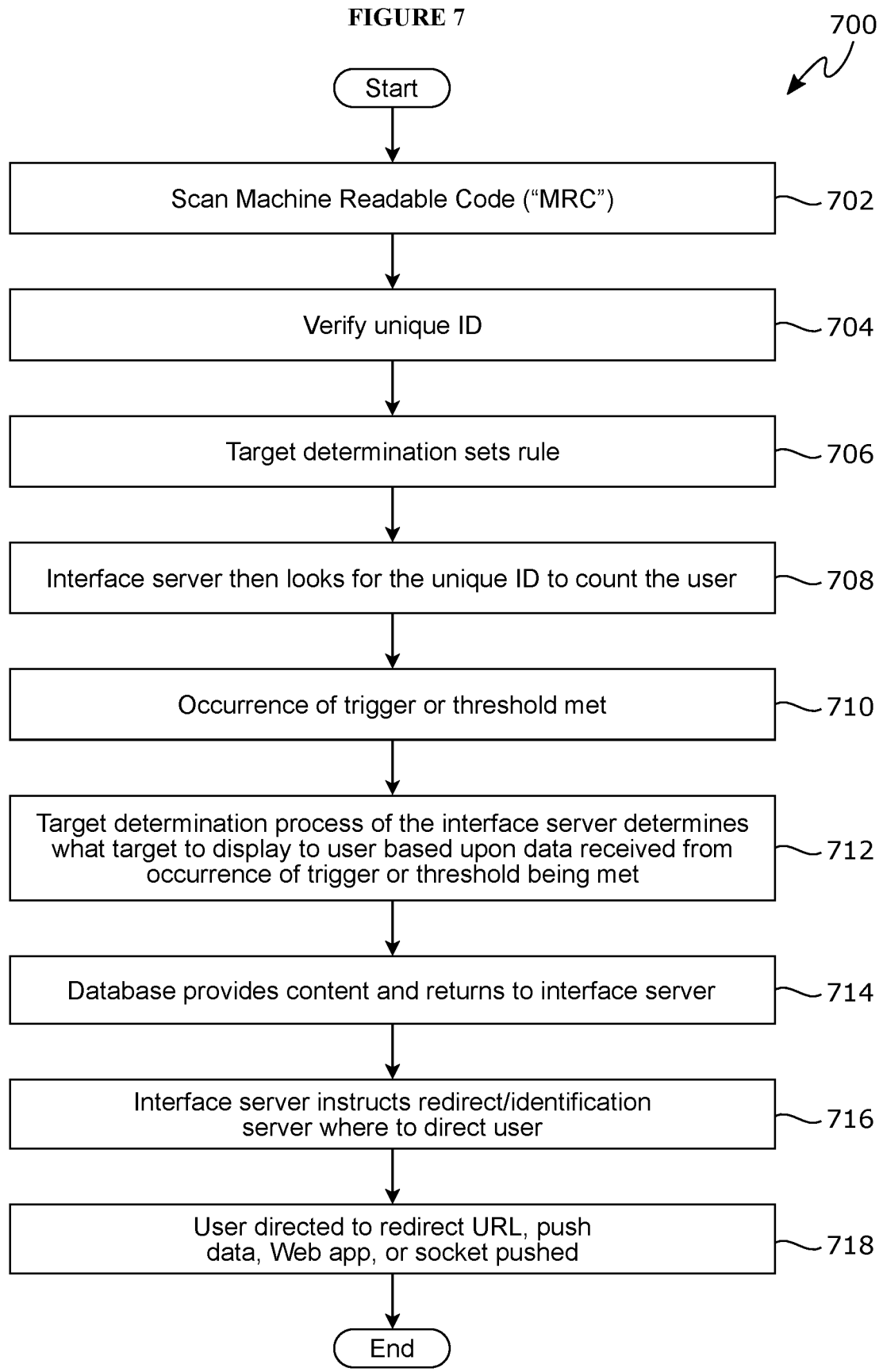
FIG. 7 is a flowchart illustrating the operation of the system of FIG. 6.

FIG. 7 details this in a flow diagram (700), with the first step (702) being to scan the tag. The user is authenticated, verified (704), as detailed in FIGS. 4 and 5. As each user ID passes through the interface server, a request is received at the target determination process (706) as to what rule to apply. Here, the target determination process sets a rule that at 1,000 users online, a free hotdog will be provided to those 1,000 users. When less than 1,000 users are online, then the target determination process (706) receives a redirect target from the database and sends this back through the interface server and redirect/identification server to load on the user device (14*a*) a home page or other target. The interface server then looks for the unique ID to count the user (708). However, upon the meeting of an occurrence of a trigger or threshold (710), and as further detailed by FIG. 7, the target determination process of the interface server determines that the rule of 1,000 users online is met (712) and triggers the release of the pre-loaded content. Thus, the target determination process receives the target from the database (714), and whatever target material was predetermined. The interface server then instructs the redirect/identification server where to direct the user (716), here the user is redirected to a URL end point, pushed data, socket pushed data, or provided information through a Web app (718), which here is the digital offer for the free hotdog.

Figure 11:
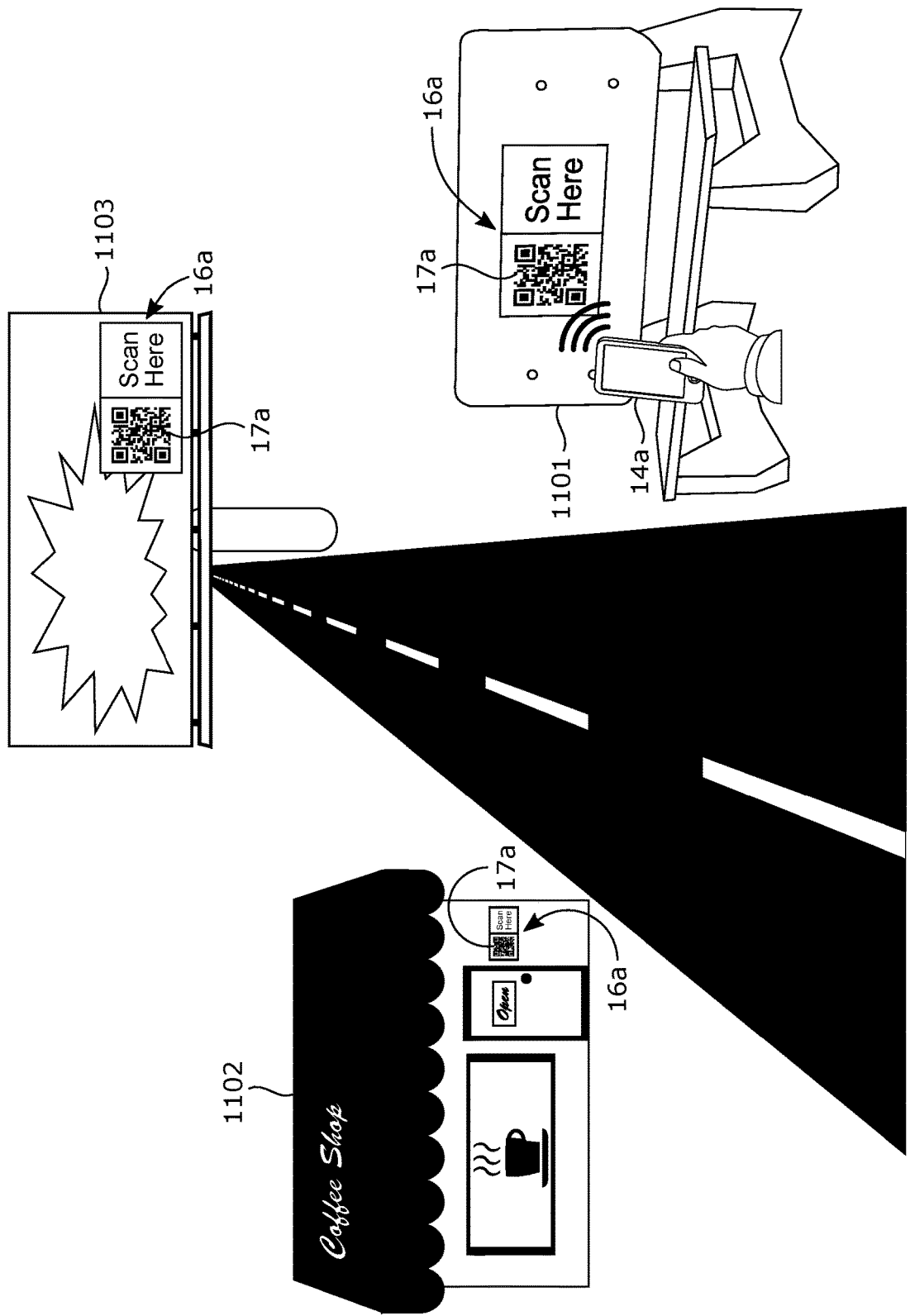
FIG. 11 depicts an area comprising a plurality of tags positioned at multiple locations.

Instead of a plurality of users meeting a threshold, a single user may need to meet some threshold, for example, scanning a tag at ten locations within the city, as shown in FIG. 11. Joe user scans one tag each day for ten days (i.e., the tag at location [1101], the tag at location [1102] and the tag at location [1103]), and on the tenth day, upon meeting the requirement threshold, the unique content or digital offer is delivered. Thus, a new movie pilot is released, and the special digital offer is the first 500 users to complete 10 scans receives a special viewing of the movie. Joe User completes the task and is one of the first 500 users and thus receives the special digital offer. These elements are defined within the system described herein.

Upon the occurrence of scanning into the system, the user and a unique ID are determined. The system can determine the total number of users on the system at a given time, i.e., the number of users who have scanned the tag (16*a*) within a given time period. In certain embodiments, the threshold may be defined as a total number of users who have scanned a tag (16*a*) during an event, and not simply who are presently online at a given moment. Thus, as in FIG. 2, the countdown (216) may refer to the total number of scans from unique user IDs at the venue during a particular event. Even if individuals are not currently on a user device, the act of scanning the tag (16*a*) is sufficient for the purposes of unlocking the unique digital offer (214) or content.

In other embodiments, the countdown (216) and the threshold are referring not simply to a single venue, but to the system as a whole across all venues and/or events, or proprietors who utilize the system. In such an embodiment, a plurality of tags at one venue or location and a plurality of tags at N number of other venues or locations are combined together. Thus, while a single venue may only have 10,000 unique tags, across the entire system, there may be 10,000,000 unique tags. This provides a much larger pool of users from which to access for generating the unique offer (214). In certain embodiments, once on the system, a user may need to engage with a particular element, a particular offer, or perform some action so as to be counted for the unique offer (214).

For example, a new movie is coming out in the BEST MOVIE EVER series. The prior movies in the BEST MOVIE EVER series generated more than 1 billion in ticket sales and there is already interest in the next to-be-released film in the series. A special movie trailer is being advertised, but to date only teaser shots of a few seconds are released. Upon generating 1,000,000 unique users to the system, the full movie trailer will be released. By scanning a tag (16*a*) a user and the user ID are engaged to the system and count as one of the 1,000,000 unique users. A threshold is set for 1,000,000 unique users in a time period t, which is set for three hours on a given day. Thus, unique IDs that are counted as entered into the system before that time period t and after that time period t will not count. Only those unique IDs on the system during the given time period t will count toward the n number.

Alternatively, the movie trailer will be released if 500,000 unique user IDs are online and active within the system at any point during time period t. The system can track and identify both counting numbers and upon meeting one of the thresholds, release the full movie trailer. The full release movie trailer may be only provided to those users who engaged in the system or can be released publicly at that point. The method here relates to communal interest in unlocking content. The proprietor, in this example, the movie company, may provide further digital offers to those users who participated, and, such digital offers can be modified based on the behavior and characteristics of the unique digital offer as it relates to the unique ID (i.e., the unique digital offer is shared on a social media and viewed 1 time as compared to a social media that is viewed 1,000,000 times). Such shares have significantly different value and thus the digital offer can be modified accordingly.

Figure 8:
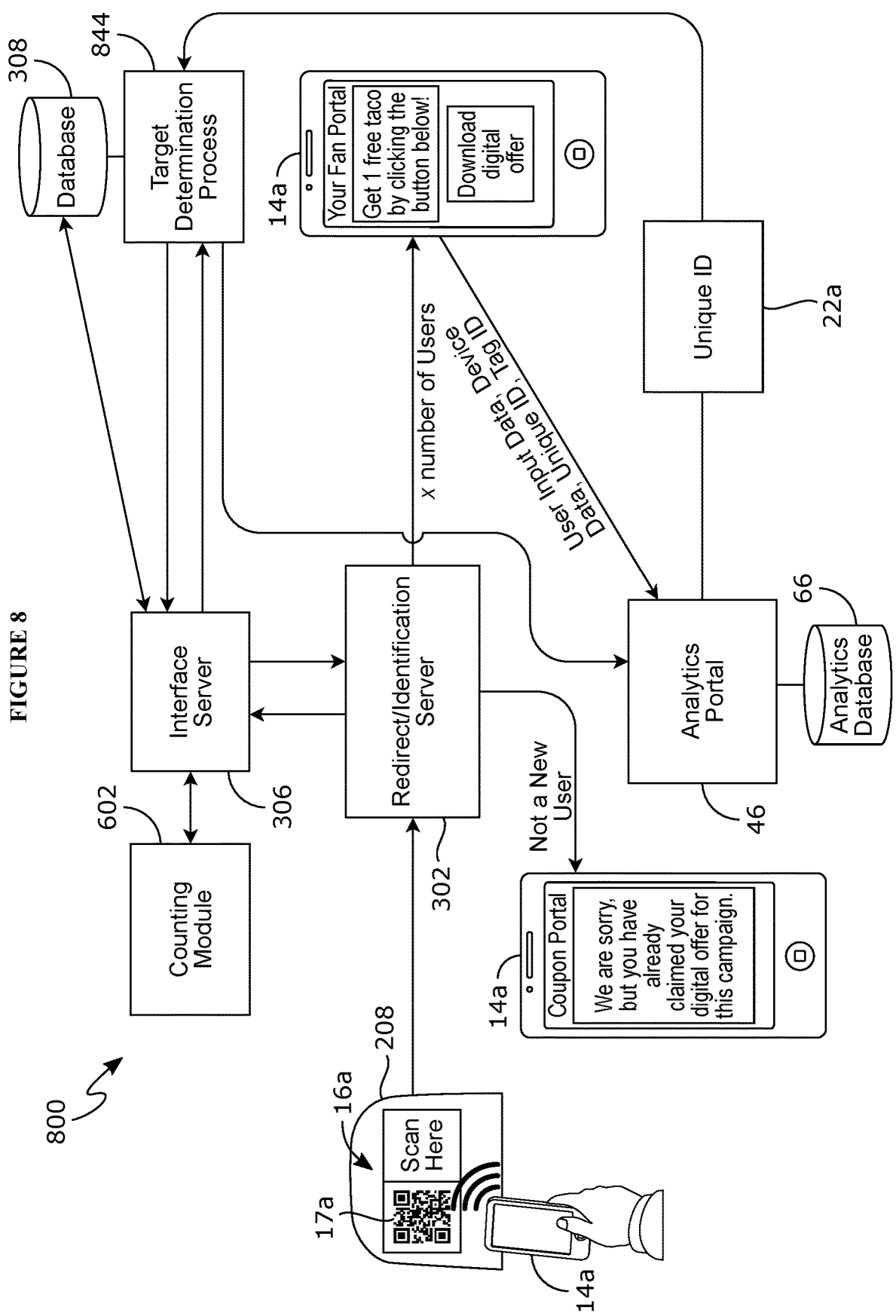
FIG. 8 is a diagram illustrating a further embodiment of the system.

FIG. 8 is a block diagram illustrating a further embodiment of the system (800). In this embodiment, the feature is determining whether a user is a new user or a returning user. This is important as a new user can claim a specific digital offer, but a returning user cannot. This way, when a specific offer is provided, a user can only obtain the offer once. Thus, following the logic of the prior figures, following a scan of the tag (16*a*) with the user device (14*a*), the user is redirected to a tag URL that is uniquely encoded to the tag (16*a*). The redirect/identification server (302) receives the tag URL request checks for a manifest and unique ID and if located, informs the interface server (306) whether the user device (14a) is new or a returning device into the system (10). In this embodiment, the interface server (306) includes a database (308) of unique IDs. If the unique ID is determined to be a returning user, for the purpose of claiming the digital offer, then that user is denied access to the digital offer to prevent the user from redeeming multiple digital offers. If the user is new and does not have a unique ID on his user device, the process of FIG. 4 is followed to generate the same. Otherwise, if the unique ID is not new, but has not claimed the digital offer, the new user and returning, but unclaimed user, now claim the digital offer. The target determination process (844) determines what content to display based upon data received from the redirect/identification server (302), and the target determination process (844) communicates with the analytics portal (46), and the analytics database (66), in view of the unique ID (22a) to return a target (807) (FIG. 6) through the interface server and redirect/identification server to the user device (14a). Notably, all of this information is stored in a database corresponding to the unique ID, so as to create a profile and information related to the user.

By including a check for the unique ID, two aspects occur. One, there is a confirmation that a single device is not scanning multiple tags to unlock special content multiple times. And two, it allows for each of the unique users to be counted and to be provided with the unique content upon its release.

As part of this process, the user could be prompted to input personal information (38) (FIG. 9) in exchange for the digital offer. The provided information could be stored in an analytics database (66) of the analytics portal (46). The analytics portal (46) may perform a number of tasks, including access to the unique ID database to retrieve information related to that particular unique ID. This can be performed on a multi-level server and database system as is known in the art. Thus, data can be stored in one or more databases and can be retrieved to allow for mining of data or to provide different data to one user over another based on the data within the portal. Thus, these databases retain data from past user interactions, including interactions assigned to individual user and/or interactions of all users who have scanned machine-readable code (17a).

Figure 9:
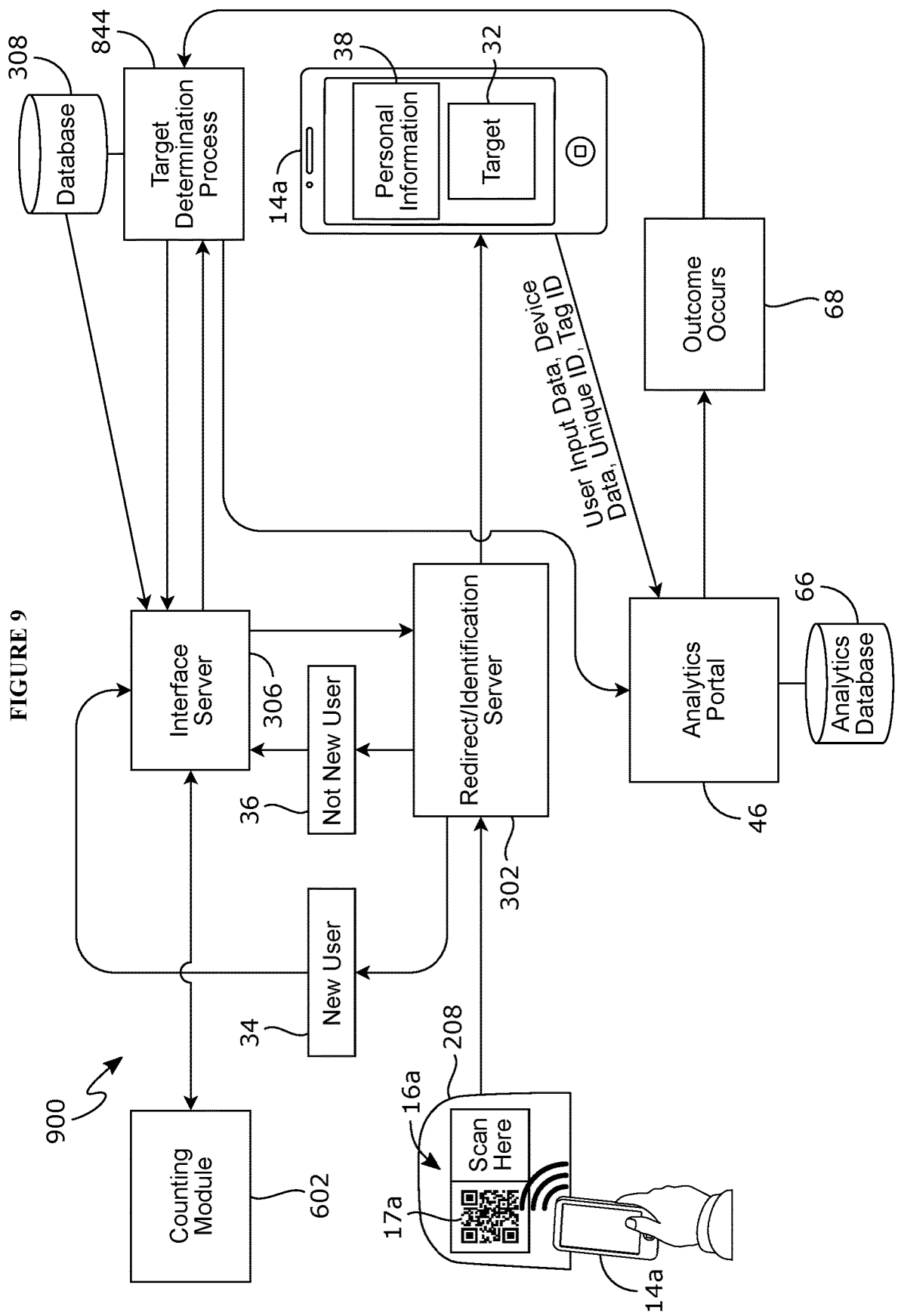
FIG. 9 is a diagram illustrating a variation of an embodiment of the system.
Figure 10:
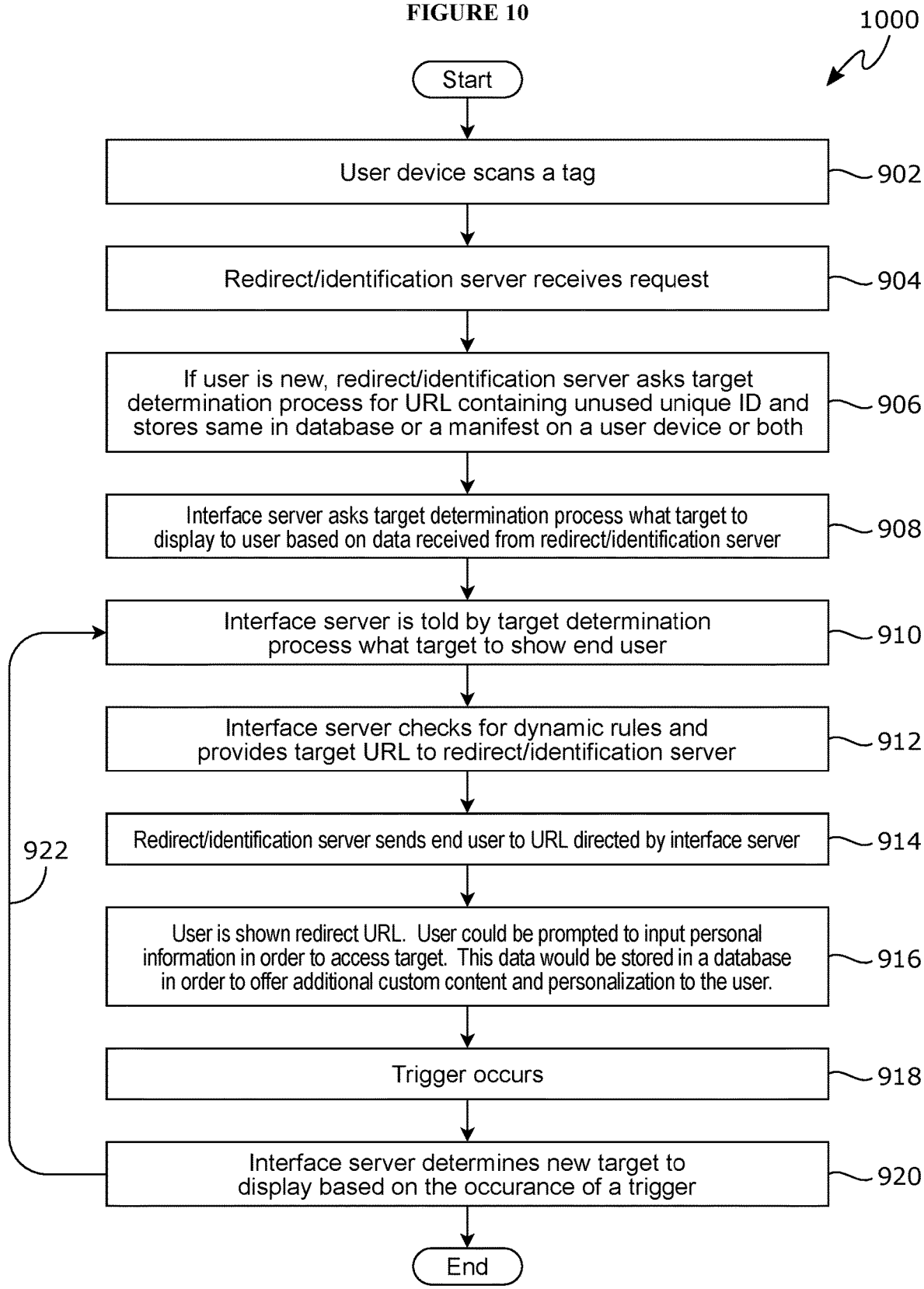
FIG. 10 is a flowchart illustrating the operations of the system of FIG. 9.

Turning to FIG. 9, and a flow diagram (1000) of FIG. 10. These examples define variations of rules can be implemented on the system to deliver dynamic content. FIG. 9 details one such embodiment, with a flow diagram (1000) depicted in FIG. 10. Additional examples and iterations described in further detail. FIG. 9 provides a first step (902) that a user device (14a) scans a tag (16a) on a seat (208). Following a scan of the tag (16a) with the user device (14a), the user is redirected to a tag URL that is uniquely encoded to the specific tag (16a) through step (904). The redirect/identification server (302) receives the tag URL request, checks for a manifest with a unique ID on the user device and informs the interface server (306) and determines the status (new or not new) of the user device (14a) to the system (900). By checking for a manifest and a unique ID on the user device and correlating it with the unique ID stored in the database a confirmation can be made of a new (34) or returning user (36). If the user is new, a new unique ID is generated (906) by the system and stored in the database and on the user device.

The interface server (306) includes a database (308) of URLs containing unique certificates used to issue digital wallet passes. If the user is determined to be a returning user (36), the interface server confirms that the unique ID located on the user device matches the unique ID in the database. If the user is a new (34) user, the system obtains a manifest with a unique ID and sends it to the user device (steps [406] and [408] from FIG. 4), and records the same within the database. At this point, the user is confirmed with an existing unique ID (22a) or possesses a new unique ID, in either case, the certificate used to issue a digital wallet pass being specific to that user device (14a).

Subsequently, the unique ID being confirmed or generated, the target determination process (844) determines what content to display based upon data received from the redirect/identification server (302) in step (908), and the target determination process (844) is told what to show the end user (910). The interface server and the target determination process (844) further check for dynamic rules and directs back to the server (912). The redirect/identification server sends the end user to the redirect URL directed by the interface server (914). However, while content is provided, a trigger then occurs (918). The occurrence of a trigger, as defined in the several examples herein, then generates a new target. Accordingly, the interface server determines the new target to display based upon the trigger occurrence (920). The process may repeat as additional occurrences of triggers are repeated to provide new targets (922).

As part of this process, a step (916) may include that the user is prompted to input unique identifying information (54) (FIG. 6) into the system (10), which allows for better analytic information on the user device (14a). The provided information could be stored in an analytics database (66) of the analytics portal (46) or in a primary database (308) among a variety of storage options.

Therefore, a target that was previously provided can actually be modified by the occurrence of a trigger. For example, the digital coupon (32), based upon a live trigger, or based upon the actions taken by a user. For example, the trigger/outcome occurs (68), may be that a home team wins a game. Upon the occurrence of the trigger, the target or offer, which was prepopulated within the database, a coupon can be modified. Thus, the digital offer/target (32) first provided for a free drink with an order of a slice of pizza can be changed through the target determination process (844) upon any rule being met, but specifically here upon a trigger event. Thus, upon the occurrence of the trigger (68), the digital offer (32) now provides a free drink and salad with the order of a slice of pizza.

Another example of a trigger (68) may include: making donation, making a wager, playing a game within the system (10), a predetermined lottery, the purchase of an item within the system, the purchase of an item outside of the system (10), but tracked via an outside API that connects to the system (10). Because of the unique ID, we can track and identify each user device (14a) and allow for customized communication based upon the occurrence of a trigger (68).

In another embodiment, following a scan of the tag (16a) with the user device (14a), the unique user ID is able to communicate with other unique user ID's currently on the system (10) via push notifications, via a chat link, or via a socket notification all within the fan portal on the user device (14a). Because the MRCs (17a) are uniquely coded to a particular seat, section or other fixed location, a user is able to communicate with other users in the same row, section, venue or other location that is part of the system, without having access to the other user's unique identifying information such as cell phone number, e-mail address or social media username. Users would have the option of receiving communications from other users based on certain parameters such as, receive communications from users in my same row, users in my same section, users from the entire venue or alternatively, not to receive any communications.

In a typical embodiment, remotely updatable machine-readable code programming provides an ability for individuals to download digital offers directly to their user devices and transfer the digital offer to other user devices. In a typical embodiment, once the individual transfers the digital offer to a predefined number of user devices, the incentivized offer increases. The system uses the unique ID stored in a manifest on the user device and in a database on the server; therefore, this digital offer is now unique to the user device on which the manifest with the unique ID is stored and must be in order to track the sharing of the digital offer. If the individual transfers the digital offer from his/her user device to, for example, five other communication devices within a fixed time period such as, for example, a week, the digital offer automatically upgrades from 10% to 20% off at the local retail store. This capability offers further incentive for individuals to transfer their digital offers to family and friends so that they will receive greater discounts. Also, this capability will allow proprietors such as brands and retailers to watch their promotion go viral from a first point of download to various locations where the digital offers are transferred between various user devices. These digital offers could also be shared and tracked via NFC, MMS, Text Message, social media such as Facebook, Twitter, Snapchat, etc. Digital offers could be browser based or stored into user's digital wallet located on his/her user device.

In a further example, BW Films is releasing a new motion picture trailer. BW Films wants the initial trailer to be viewed by at least 10,000 viewers on the initial launch and is marketing the film to college students. ZY University is hosting a football game at the campus stadium. As described more fully in FIG. 2 and FIG. 4, each seat in the stadium has a tag (16a) installed on the armrest and each tag contains a MRC that is uniquely coded to the system via a tag ID. When the fans arrive at the stadium, each fan who wants to interact with the system scans the tag on his or her armrest. Once scanned, method 400 is executed. The redirect/identification server can be programmed with certain rules. For example, a rule could be if a user device does not rescan the tag within thirty minutes, or if the user does not interact with any of the redirect URLs the interface server sends to the user device within a thirty-minute time period, that user device may be categorized as inactive and removed from the count of total number of user devices currently active on the system. A counting mechanism (FIG. 6, 602) can be utilized with any of the embodiments to track and account for any rule or metric that requires some form of tabulation of users, whether a total or active, as non-limiting examples of counting. Once the redirect/identification server has verified that there are 10,000 unique and active user devices on the system, it directs the interface server to deliver a unique redirect URL to each user device that will allow the user to view the motion picture trailer.

In another example, BW Films wishes to reach a larger market to launch a new motion picture trailer. BW Films would like a total of 500,000 viewers with a minimum of 5,000 viewers in each of ten venues. BW Films knows that Saturday is traditionally game day for college football. As fans arrive at the campus stadium where tags are installed on the armrests of the seats, the fans scan the tags with their user devices and method 400 is executed. The redirect/identification server continues to tally user information, via the counting mechanisms described in FIG. 4, FIG. 5, and FIG. 6 until each parameter set by BW Films is met. Therefore, when the redirect/identification server knows that each of the ten venues designated by BW Films has 5,000 unique and active users and that there are a total of at least 500,000 unique and active users on the system, the redirect/identification server will direct the interface server to deliver a unique redirect URL to each user's device so that the user can view the film trailer. Alternatively, the interface server can tally the number of unique user devices currently on the system rather than the tally being completed by the redirect/identification server.

In another example, tags are installed in hotel rooms throughout the country. WS Airlines would like to offer a flash sale on air travel and sets the parameter that there must be 10,000 unique users on the system at one time in order for the digital discount offer to launch. When a user enters his hotel room, the user scans the tag with the tag that is installed in the user's hotel room and method (400) is executed. Once the redirect/identification server has tallied that the number of unique users has reached the minimum threshold set by WS Airlines, the redirect/identification server directs the interface server to deliver a target, i.e., a digital offer for the flash sale. The digital offer can be a unique discount code for each user, a single discount code for all users, a digital or mobile wallet offer that can be added to the user device, pushed to the user device, sent through a socket, updated in a Web app, or the user can be sent a unique redirect URL.

In another example, N & N Candy is launching a new flavor of candy bar. The marketing campaign consists of a video advertisement and a digital offer for a free candy bar. N & N sets the parameters that this campaign will be launched on college campus when the unique number of users on each campus reaches 50,000. Each dorm room on the college campus contains a tag. The tag contains a tag ID that is coded in the system to identify that it is located on a particular college campus. Optionally, the tag ID can also be part of a tag grouping. When the student enters his dorm room, he uses his user device to scan the tag which executes method 400. In this instance, the counting mechanisms described in FIG. 4, FIG. 5, and FIG. 6 not only counts user is new or existing, but the count also tracks the university campus on which the MRC is located because each tag ID is part of a tag grouping for a specific campus. The redirect/identification server tallies the number of unique and active users at each college campus location. Once the number of unique and active users at any one location exceeds the number specified by N & N Candy, the redirect/identification server directs the interface server to deliver a unique redirect URL to the user device which allows the user to watch the video advertisement on his user device and the interface server also delivers a digital offer for a free candy bar. The digital offer can be in the form of unique discount code for each user, a single discount code for all users, a unique digital or mobile wallet offer that can be added to the user's device or the same digital or mobile wallet offer that can be added to all user devices. In this example, the users at ZY University may meet the minimum threshold set by N & N Candy within one hour of the launch of the marketing campaign and thus be given access to the video content and free candy bar offer within one hour. However, the users at BA University may not meet the minimum threshold set by N & N Candy for several days and therefore, the users at BA University will receive access to the video content and free candy bar offer several days after the users at ZY University receive their offer.

In another example, a musical group would like to provide their fans with an opportunity to download the group's latest single. The group is performing in a venue that has a tag installed on the armrest of each seat and each tag contains an MRC that is uniquely coded to the system via a tag ID. The group is also live streaming the event over the internet and the online production of the performance will display a QR or similar MRC in the bottom corner of the video feed. The group has decided that they will release the single when the total number of unique and active viewers reaches 100,000 users regardless of the location of the user device. Users at the venue scan the tag with their user device which executes method (400). Likewise, users viewing the concert's live stream can scan the QR code that appears in the broadcast with their user device which also executes method (400). Once the total aggregate number of unique users meets the minimum threshold set by the musical group, the redirect/identification server directs the interface server to deliver a unique redirect URL to each user device allowing the user device to download the musical group's latest signal.

While counting of a plurality of users is important for mass marketing, in certain embodiments, individualized marketing is more important. Thus, in a further example, a user must scan a certain number of tags in order to unlock specific digital content or offers. In this example, as shown in FIG. 11, tags are placed throughout one location or in multiple locations (i.e., a bus bench [1101], a coffee shop [1102], or a billboard [1103]). However, this configuration could also work for a museum with tags at multiple exhibits, a shopping mall with tags at multiple stores, multiple tags placed throughout a particular town or city at certain establishments in that town or city or multiple tags placed at particular locations throughout a larger geographical area. For purposes of the example, the tags have been placed at restaurants throughout Fort Worth, Tex. Stockyards Rodeo wishes to launch a marketing campaign where they provide a mobile or digital offer of buy-one, get-one-free tickets to users if the user has frequented a certain number of restaurants in the Fort Worth area. Stockyards has set the parameter (i.e., rule) that users must visit four restaurants in order to unlock the digital offer. When a user arrives at the restaurant, he uses his user device to scan the tag that may be mounted next to the door or the restaurant, in the lobby of the restaurant, or at a particular table in the restaurant, which executes method (400). If the user is new, the identification server notes the device, location, date, and time of the scan and creates a new user/device ID record for this campaign. If the user is existing, the server retrieves the user's existing user/device ID record for this campaign, notes the location, date and time of the scan and updates the user/device ID record to reflect the total number of scans. This process is repeated each time the user scans a tag at a restaurant in Fort Worth until the user meets the parameter set by Stockyards to unlock the digital offer, in this instance, the user must visit four restaurants. Once the user/device ID record for this campaign meets the parameter set by Stockyards, the redirect/identification ID server directs the interface server to deliver a unique redirect URL or digital offer to the user device for buy-one get-one-free tickets at Stockyards.

In certain embodiments, the system may be utilized in conjunction with a digital wallet or wagering wallet for wagering. In the event of a wagering component, users would be able to scan the tag with the user device and be taken to a live wagering portal, which could be browser based or in the form of a cloud or locally based mobile application, including a progressive Web app. Using the system's analytics portal, the user would be able to see their past wagers across the entire system and place their wager utilizing a digital wallet solution such as Apple Pay or Google Wallet, or through traditional payment methods. All of the interactivity and wager-based actions will be facilitated without the need for the user to create a traditional user profile, unless so required by law. This same wagering configuration could be utilized to offer "brand wagers" wherein the prize given to the user is a physical item given to the user such as a promotional item from a team sponsor or a digital reward which can be downloaded or emailed to the user's device.

Fan engagement at sports venues often goes beyond the game itself. When the moment arises, fans are often generous to causes that are supported by their team, which may be provided to nonprofit organizations. Therefore, in a venue, the team may request support of one or more charities, and the platform could allow for the ability to donate money in real time directly from their venue seat via the NFC and/or MRC. For example, if the donation were to Salvation Army, the user would, either with or without prompting from the venue multimedia display system or jumbo screen, scan their tag and be prompted to donate money either using their digital wallet or traditional payment methods. In keeping with the earlier claims, the system would allow proprietors to deploy various customizable donation templates to every seat, row, or section if desired. Additionally, after the donation transaction is complete, the user could be offered a physical or digital reward that could be used inside or outside of the venue. Indeed, the benefit of the system is that the user device contains a unique ID stored in a manifest that is indicated in the system. Accordingly, this allows the system to identify a user device corresponding to a particular user ID as donating a certain dollar amount. The system can be prepopulated with "rewards" or incentives to donate or reach a cause.

For example, a cause may be for a single section of a venue to raise $100 (i.e., 224 from FIG. 2). All donations originating from tag within the particular section can then be aggregated to determine if the section reached the $100 donation goal, or if a certain percentage of the section participated in reaching the goal. Accordingly, if there are 200 people in the section, a donation of an average of 500 would be sufficient to hit the goal. The system can then populate a predetermined digital or physical reward, i.e., a coupon or some other offer that can be used at the venue, or some other tangible or intangible reward. The system can go one step further as it can quickly tabulate the donations and, in real time, the system can allow sections to compete with one another. Thus, section 1 (i.e., 224 from FIG. 2) could "race" section 2 (i.e., 226 from FIG. 2), to reach a donation goal. This allows for gamification within the system based upon the use of tags that are provided in a venue or location.

Embodiments may also allow for real time data/polling of event attendees, i.e., voting for your favorite player, predicted outcome of the game, predicted score, games displayed on a jumbo screen, real-time events/outcomes at the stadium, etc. However, the real-time polling is enabled by the individualized nature of both the user device and also of the tag. For example, where only one of the user devices or the tags is unique, it is impossible to identify both the user and also a population of similar users. If a section of a stadium is competing against another section, we need to have each user device connect to a tag in their particular section, via a tag ID grouping, and then participate as a group to reaching the offer threshold. If the group element is missing, such "sectional" competition would not be possible.

While the group may participate together, because of the unique ID, individual user rewards can be provided, for example, as a user makes a larger donation, that user is provided with a larger reward than another user from the winning section. Because the unique ID stored in a manifest on a user device allows for tracking of actions, i.e., the donation by the user, individual rewards can be provided to that user, corresponding to that particular unique ID.

All of these actions provide opportunities for the system to capture user data. When the plurality of tags (16a) is scanned with the user devices (14a), analytical data is collected. The analytical data may be, for example, date, time, GPS location of a tag, GPS location of a user device (14a) when it scanned a tag, the type of user device used to scan a tag, orientation of a user device when a machine-readable code was scanned, and type of operating system on a user device that scanned the tag. The exemplary method and system couple the collected analytical data from the physical scanning of the plurality of tags (16a) with data collected once the individual is directed to the target. In a typical embodiment, the data may be, for example, time spent on a Web page, purchases made, IP address, personal information input by the user, and products viewed. Such data is of high value to, for example, advertisers, team owners, and venue owners as it provides a large insight into consumers purchasing and Web browsing habits.

The user data can remain anonymous to a large extent, as it is collected based upon the user device scanning a tag and not dependent on the user logging into the system. Therefore, data does not need to be correlated with the actual identity of the person controlling the user device. It is immaterial whether the user is male or female, or young or old, instead it is the particular set of data that creates a picture and certain mobile offers or content can be provided based upon that data, and then modified based upon the occurrence of one or more actions, such as donations as above, or other purchases, or an outcome in an embedded game or task, or upon the outcome of the game at the venue, as nonlimiting examples.

Data can also be gathered outside of the system, for example, through an API connecting the system to a third-party server or database. The benefit of also utilizing user data that is gathered from outside of system itself is that it provides data that might not otherwise be gathered, while also offering an opportunity to "preset" content when a user scans the tag at their seat. Example 1: If event ticket provider such as Ticketmaster®, provided data to the system's analytics portal revealing that Joe purchased tickets to the football game to sit in seat 1, row 1, while also providing data, known to Ticketmaster, such as that Joe is a 32 year old male (data that is provided to Ticketmaster from Joe when he creates his Ticketmaster account), because each tag in the system is uniquely encoded down to the individual seat or specific location via a tag ID, the analytics portal would have the ability to "preschedule" content that would appeal to a 32 year old male when Joe takes his seat at the game. This use case could be valuable for marketers looking to market to a particular subset of attendees, vs the entire stadium or venue. The data can be from more than just one event as well. If Joe has previously purchased other tickets from Ticketmaster, that data may also be available and provides further details and information relevant to Joe, which can be used to provide better content to Joe. If Joe only buys rock concert tickets, for example, providing country music listings for new concerts would not be the best targeted advertising for Joe—so modifying the content to that of Joe's interests (rock concerts) provides greater value for advertisers and also to Joe.

A machine learning component of the system would allow sports teams to provide more relevant real-time offers to fans by customizing content based on user interaction. Example 2: If Joe scans his tag and is taken to the team fan portal where he selects "buy merchandise". 75% of the time Joe purchases a shirt, but he never buys a hat, then the system would have the ability to adjust Joe's offerings in real time to show him a larger selection of shirts, instead of hats, based off of his past purchasing and browsing habits. Alternatively, the system could use this data stored on Joe's purchasing habits to deliver a customized digital offer to Joe to entice him to buy merchandise that is not a shirt such as a 25% discount if Joe buys a hat. This could be valuable to proprietors, teams, performers, promoters, or venues looking to sell items from merchandise to food inside of the venue or based upon inventory considerations. The system has the ability to learn user characteristics from user input within various user portals mentioned above (Web browsers, PWAs, etc.). This component would provide a user with customized content based on their previous content interactions inside of one venue, or interactions across the entire system network of tags. It would also allow said system to store user and/or the user device information in order to offer specialized incentives based on past usage statistics. For example, the system may reward Joe for scanning the tag at his tenth straight baseball game by delivering an offer for "team VIP" merchandise. Or the system could provide Joe an offer for a hot dog, peanuts, or soda at a reduced rate based on his purchase history or incentivize him to make a purchase with a digital offer, if he typically does not purchase food or beverages.

The benefit of the unique ID, in combination with the tag ID is that a single tag, having its own tag ID, can be scanned by multiple user devices, and each scan by a different device will have a different unique ID. This allows proprietors such as venue owners, teams, universities, marketers, performers, promoters etc., to offer individualized digital offers to every user device that scans a tag. Example 3: The system offers unique digital wallet certificates for each user upon scanning the tag, which means that if fifty users scan the same tag with their user device, all fifty user devices will individually have a unique record within the system database. Thus, a single tag could be located in a centralized location and would still allow for unique content (the digital offer) to any user who scanned that tag. The system might deliver a different digital offer to each user so if Joe scans the tag, his digital offer might be for a half price soda at the concession stand, but if Joe's wife scans the same tag from a different user device, having a different unique ID stored in a manifest, her digital offer might be for a half price hamburger at the concession stand. Likewise, the system will be able to track if a user activated and redeemed his or her digital offer.

The system may offer "group passes" wherein the system could offer a digital offer that was only able to be issued to a predetermined number of users. Thus, the first person, the first 5, the first 10, 25, 50, 100, 500, 1000, 10,000, nth, person to scan the tag (and all numbers in between), may be included within a group. The distribution of such group passes and counting of executions of the system to a user device, can be used as a game or for other giveaway plans. It is common knowledge of the types of games where the "100th person to download wins a prize," or "only the first 100 people can claim a prize if they buy or click now." The ability to track these types of programming through the system provides a new way to manage such programs.

The system could also be implemented within a traditional mobile application or Web-based platform whereas the user would be offered the unique digital offer once they visit said application or URL address. Because of the individualized nature of the unique ID in the system, the unique digital offer can then be directly modified based upon chance, some data, or trigger occurring which allows the provider of that unique digital offer the opportunity to modify an offer. For example, an offer is for 10% off a pizza, but the offer becomes 25% off once the offer is shared with at least 2, 5, 10, 25, 50, n number of people, who also download an offer. This allows tracking of who downloads an offer, how many are tracked to a particular offer, and allows for modification and improvement of an offer based on metrics related to sharing.

Another embodiment would be for a proprietor such as a retailer to provide a digital offer in the form of real time discounts to users in specific venues via the tags (16a) upon the occurrence of a threshold set by the retailer. For example, if the tags (16a) inside of the venue (202) are linked to a specific retailer via a tag grouping or geofencing, then that retailer could offer discounts in real time that could only be accessed by users inside of the venue (202) upon the occurrence of meeting a threshold of interest in that particular offer. Here, the trigger event is that at least five people scan a tag related to a particular offer. The occurrence of a real time discount is a trigger, wherein the trigger executes a modification of a digital offer or of the content that is provided to the user device (14a) as soon as the at least five people scan the tag for that offer.

Embodiments of the invention also provide individuals an ability to establish interactive communication via tags (16a). In a typical embodiment, the plurality of tags (16a) can be programmed to perform various designated actions such as, for example, an ability to download a digital offer (e.g., a digital coupon) straight onto the user devices (14a) which could be redeemed at a concession area or retail location. For example, the digital offer could be redeemed by the individuals upon performing a transaction at a retail or concession area using, for example, the NFC enabled user device. This provides proprietors such as concession owners, retail owners, and advertisers an ability to immediately see conversion rate of a digital offer that is issued (i.e., 100 coupons were scanned via the plurality of tags and 80 were redeemed). These digital offers could be redeemed at retail locations inside or outside of the venue. If the offer rate is lower than desired, the proprietor can increase the offer to improve the rate of use of the offer.

The machine learning and custom content aspect of the system is not limited to in-venue applications and can be utilized across multiple industries such as rideshare vehicles, aircraft, ships, trains, hotel rooms, dorm rooms, vacation rentals, etc. The broad spectrum of the embodiments is to offer location based custom content solutions to user devices.

In the case of hotels and collegiate dorm rooms, the system would be comprised of a plurality of uniquely encoded tags (16a) placed inside of guest rooms whereas there is one NFC enabled and/or MRC tag per room, or one per guest/resident of said room. Each tag (16a) would be connected to system servers which would allow said tags to offer predetermined content based on pre-supplied data points. In the collegiate dorm use case, users would scan the tag (16a) located within their room and be shown content based on various factors such as their gender, education major, year of schooling, etc. The content on these tags would also utilize data points and usage reports from the system itself to better serve users with relevant content. These tags could also allow marketers, and the university at which they are deployed, to offer incentives such as game tickets or retail store coupons, directly to the students in their dorms via a digital offer or mobile wallet offer, while providing the option to provide the offers and content to only select, or all, tags based on various analytics provided within the system. Tags would also allow students and hotel guest to offer real time feedback on the system in the form of user submissions to conduct live polling procedures. This use case would provide a valuable platform for universities, marketers, and hotel owners to offer customized content to their guest on an individualized basis.

Another unique feature of the system is that the data that is collected in order to provide content can be gathered system wide when a user scans one of the plurality of tags in any location. This feature would allow marketers to understand consumers characteristics more closely from a location experience, and to provide the user relevant content across a multitude of markets. Example 4: If a tag is scanned by Joe at a football game in Arlington on a Sunday, and then a tag is scanned by Joe in a rideshare vehicle in Boston the following Wednesday, the system would understand that the user, Joe, was the same for both interactions, without Joe having to log into the system, and display content accordingly based on data provided from the analytics portal. This is because the system knows the user, Joe, because of the unique ID stored in either on the manifest on the user device or on the server, or both. By scanning a tag, the system can also upload data to generate more information Joe and his activities and interests, so as to provide better content to Joe through the content.

The step of collecting user data associated with the user may also include the step of receiving in-venue metrics via an in-venue metrics API (50). This API (50) may enable information about the user to be gathered based upon purchases of tickets (past and present), purchases of food, merchandise, and other goods and services from the venue. The step of collecting user data associated with the user may also include the step of receiving third-party metrics via a third party metrics API (52). This third party metrics API (52) may enable information about the user to be gathered from third parties who participate in a shared program, or who sell or otherwise provide marketing information, demographics, and other data about the user. The step of collecting user data associated with the user may also include the step of receiving information from other data forms available to the system.

Finally, as ticketing is a key feature of many of the embodiments, the step of collecting user data associated with the user may also include the step of receiving information from ticket brokerage metrics via a ticket brokerage metrics API (56). These metrics may include information gathered by the ticket brokers who sell tickets at the venue (202) (in FIG. 2), and may include a wide range of marketing data, not only about ticket purchases made, but also related information about the user.

Rolling offers may also be desirable. For example, a restaurant at a sporting venue may want to discount food (so none is wasted at the end of the game) and selling food for discount when a specific time point in the game or event is reached. This allows for real-time feedback within the event and within the system of inventory, wherein price or an offer can be modified based on the particular inventory. An advertisement or coupon can be generated as mobile content in real time to users on the system to incentivize such consumption. For purposes of this application, the terms "real time" and "real-time" means any interactions that are provided within ten seconds of a trigger occurring, or longer, as determined by the proprietor, but not longer than 60 seconds after the occurrence of a trigger occurring.

Referring back to FIG. 3, the infrastructure detailed therein is exemplary, dividing processing between at least two servers (e.g., redirect/identification server [302] and interface server [306]), but embodiments are not so limited. The numbers and types of servers and software may be scaled up, down, and distributed according to platform (20) demands/needs. Furthermore, more than one virtual machine may run on a single computer and a computer/virtual machine may run more than one type of server software (e.g., the software that performs a service, e.g., Web service, application service, and the like). Thus, in some instances platform (20) may include one computer for all processing demands, and in other instances platform (20) may include several, hundreds, or even more computers to meet processing demands. Additionally, hardware, software, and firmware may be included in or removed from platform (20) to increase functionality, storage, and the like as needed/desired.

Administrator device (12), which is shown in FIG. 1, may be any type of computer such as a laptop computer, desktop computer, tablet, and the like. Similarly, user device (14a or 14b) may be any type of processing device such as a handheld computer (e.g., phone, smartphone, tablet, personal digital assistant), wearable computer (e.g., watch, glasses), or portable computers (e.g., laptop, netbooks). Scanning of the tag (16a, 16b) from the user device (14a or 14b) is performed through near-field communication (NFC) or use of a camera on the user device (14a or 14b) to scan the visible quick response code (QR code). Administrator device (12) and user devices (14a or 14b) typically include a browser application to facilitate communications with one or more servers among other things.

Administrator device (12), user devices (14a, 14b), and servers (e.g., 302, 306, 310, 312, 320, 322, and 324) may each be a general-purpose computer. Thus, each computer includes the appropriate hardware, firmware, and software to enable the computer to function as intended and as needed to implement features detailed herein. For example, a general purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU). Likewise, the memory may be any suitable memory device such as Random Access Memory (RAM), Dynamic Random-Access memory (DRAM), or Static RAM (SRAM), without limitation. The processor together with at least the memory may implement system and application software including instructions, including methods, disclosed herein. Examples of suitable storage includes magnetic disk drives, optical disk drives, tape drives, an internal storage device, an attached storage device, flash memory, hard drives, and/or solid-state drives (SSD), although embodiments are not so limited.

In an embodiment, servers (e.g., 302, 306, 310, 312, 320, 322, an/or 324) may include database server functionality to manage database (308) or another database. Although not shown, infrastructure variations may allow for database (308) to have a dedicated database server machine. Database (308) and any other database may be any suitable database such as hierarchical, network, relational, object-oriented, multimodal, nonrelational, self-driving, intelligent, and/or cloud based to name a few examples. Although a single database (308) is shown in FIG. 3, in embodiments database (308) may comprise more than one database, the more than one database may be distributed across many locations, and data may be redundantly recorded in the more than one database. Furthermore, data may be stored in blocks that are part of a chronological blockchain (314) and may be dispersed across a decentralized distributed ledger. Blocks of data in a blockchain are linked in such a way that tampering with one block breaks the chain. Thus, digital data stored in a blockchain is verifiable with an elevated level of integrity. Therefore, the database (308) may also be a distributed database system, utilizing blockchain (e.g., 314) to provide for storage of NFTs or the like related to the system. As with any distributed database, the number of databases and particular nature of the blockchain storage is dependent on the particular exchange or blockchain utilized for the NFT as one non-limiting example. The use of a distributed database system is well known and the storage of an NFT or the like requires the use of such systems. Geofence (316) and Time (318) may be software services provided by the platform (20). These services (316, 318) may be executed by any or all of the computing machines, virtual or otherwise, found on the platform (20). These services may use data from one or more user devices (14a, 14b) and other data sources to provide their intended functionality as is known in the art.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems and methods may include one or all of the limitations of an embodiment, be performed in any order, or may combine limitations from different embodiments, as would be understood by those implementing the various methods and systems detailed herein.

What is claimed is:
1. A method for delivering dynamic content to a user device via a machine-readable code comprising:
   a. in response to scanning a tag comprising the machine-readable code, receiving a request from a user device and detecting the presence of a manifest comprising a unique ID, wherein if no unique ID is present, creating a unique ID and associating a record with the unique ID within a database;
   b. detecting from the tag a tag ID and determining:
      i. whether a venue exists corresponding to the tag ID; and
      ii. whether an event is in progress corresponding to the tag ID;
   c. redirecting to a global default target if no venue exists or no event is in progress, and determining if a tag ID is grouped where the venue exists and an event is in progress;
   d. counting, via a counting mechanism, the total number of unique IDs scanning a tag within the venue, displaying on a display associated with the user device, the venue, or both, the counting of the counting mecha- nism, and determining, via the counting mechanism, whether a threshold number of unique IDs have scanned a tag;

e. upon meeting the threshold number, in response to the detecting from the tag ID, obtaining tag ID group information and associating the tag ID with the unique ID;

f. associating the unique ID and a unique ID record with the tag ID and redirecting a user to an appropriate target; and g. providing a first target to the user device when the threshold number is unmet, the first target customized based on the venue, the event, the tag ID, the tag ID group information, the unique ID, or combinations thereof, and redirecting the user device to the target upon meeting the threshold number wherein the redirected user device corresponds with a unique ID counted by the counting mechanism.

2. The method of claim 1 wherein the threshold number is selected from the group consisting of: a total number of unique users on a system at a time t, the total number of unique users accessing a system after a time t, x number of scans corresponding to a unique ID and x number of tags, and combinations thereof.

3. The method of claim 2 wherein the total number of unique users on the system at a time t is greater than 1,000.

4. The method of claim 2 wherein the total number of unique users on the system after a time t is greater than 1,000.

5. The method of claim 1 wherein redirecting the user device to a new target is redirected through a push notification.

6. The method of claim 1 wherein the machine-readable code is selected from the group consisting of: a barcode, a quick response (QR) code, a near-field communication (NFC) code, a radio-frequency identification (RFID) code, and combinations thereof.

7. The method of claim 1 wherein the target is stored within a database and is automatically redirected upon the occurrence of the event.

8. The method of claim 7 wherein the target is selected from the group consisting of: a digital offer and an advertisement.

* * * * *